(12) United States Patent
Bonnacorsi et al.

(10) Patent No.: US 6,386,243 B1
(45) Date of Patent: May 14, 2002

(54) LEAD FORMATION IN UNDULATED COILS FOR DYNAMO-ELECTRIC MACHINE STATORS

(75) Inventors: Andrea Bonnacorsi, Turin; Gianfranco Stratico, Siena, both of (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 09/546,195

(22) Filed: Apr. 10, 2000

Related U.S. Application Data
(60) Provisional application No. 60/129,094, filed on Apr. 13, 1999.

(51) Int. Cl.[7] .................................................. B21F 3/00
(52) U.S. Cl. .................................................... 140/92.2
(58) Field of Search ............................... 140/92.1, 92.2

(56) References Cited

U.S. PATENT DOCUMENTS

| | | | |
|---|---|---|---|
| 3,636,990 A | * | 1/1972 | Eminger et al. ............ 140/92.1 |
| 4,512,376 A | | 4/1985 | Barrera ....................... 140/92.1 |
| 5,881,778 A | | 3/1999 | Barrera ....................... 140/92.2 |

FOREIGN PATENT DOCUMENTS

| | | | |
|---|---|---|---|
| EP | 0 818 874 A1 | 1/1998 | .......... H02K/15/06 |

* cited by examiner

Primary Examiner—Lowell A. Larson
(74) Attorney, Agent, or Firm—Fish & Neave

(57) ABSTRACT

Apparatus and methods for reducing the likelihood of damage to wire leads of undulated coils for dynamo-electric machine stators are provided. The invention provides a rotating winding head equipped with a coil former that has a wire gripper and an initial wire lead slot. The gripper retains the initial wire lead. The slot permits the initial wire lead to be fed to the gripper from a stationary wire source. The gripper maintains the initial wire lead in a predetermined plane of the coil and can secure the initial wire lead in the plane in which the final lead wire will eventually be disposed. The gripper also rotates the initial wire lead into radial alignment with a lobe of the undulated coil. Once installed in a stator, the initial and final wire leads can both be disposed along the outer radius of the coil and are thus protected from interference with a rotor that is destined to rotate within the stator.

32 Claims, 21 Drawing Sheets

LEAD FORMATION IN UNDULATED COILS FOR DYNAMO-ELECTRIC MACHINE STATORS

This application claims the benefit of provisional application No. 60/129,094, filed Apr. 13, 1999, which is hereby incorporated by reference herein in its entirety.

BACKGROUND OF THE INVENTION

The present invention relates to winding coils for lamination stacks of a stator. More particularly, the solutions of the invention are concerned with winding coils of alternator stators, and forming the relative end leads. The coils that become wound by the solutions of the invention have an undulated shape, like those that are formed by the apparatus and functioning principles described in U.S. Pat. No. 4,512,376 (herein referred to as "Barrera '376") assigned to the same assignee of this application. (Barrera '376 is hereby incorporated by reference herein in its entirety.)

As shown in FIG. 1, which is a perspective view of a traditional undulated coil 10 formed according to the principles of Barrera '376, coil 10 has a central axis O, which is substantially perpendicular to the various wire turns 20 of the coil, each of the wire turns defining a plane P. (Those skilled in the art will appreciate that a reference to a "plane" in connection with a helical coil is an approximation used for convenience herein.) Initial lead 11 of the coil is contained in lowermost plane A of the planes P, while final lead 12 is contained in uppermost plane B of the planes P. Coil 10 becomes inserted in respective slots 13 of stator stack 14 as shown in FIG. 2. This is done by means of an insertion operation requiring pushing of the coil in the longitudinal direction 15, parallel to axis O, with the stator stack in an overhead position, aligned with axis O. The coil is placed on an insertion tool (not shown) to accomplish such an operation. In pushing the coil into the stator stack, radial arms 16 of the coil become inserted in the slots 13, while bridging sections 17 form the end portions of the coils, and are located outside the extreme faces of the stack. As shown in FIG. 2, leads 11 and 12 have been rotated to become practically parallel to axis O. In FIG. 2 the stator stack has been turned upside down with respect to the position which it would have when pushing in direction 15 of FIG. 1 during the insertion operation. The distances of leads 11 and 12 from axis O after the coil has been inserted in the stator stack are particularly pertinent to presentation of this invention. As shown in FIG. 2, initial lead 11 is nearer to axis O than final lead 12.

Usually, at least three coils (often referred to as phase coils) like coil 10 are inserted in the stator stack to form the final product. These can be inserted into the stator stack simultaneously or separately. Each coil will be inserted in respective and different sets of slots. When inserted, the coils will be at different radial distances from center axis O of the stack, as shown by references R1, R2 and R3 in FIG. 3, corresponding to coils 8, 9, and 10. FIG. 3 is a partial view of the stator, as seen from direction 3—3 of FIG. 2, but with all three coils inserted, as would be required in the final product. For sake of clarity only one coil has been shown in FIG. 2.

It is clear from FIG. 3 that initial lead 11 of coil 10 (the nearest to axis O) can be very near to central opening 10' of the stack. This is also evident from FIG. 3a, which is a view from direction 3a—3a of FIG. 3. (The location of axis O is not shown accurately in FIG. 3a or FIG. 11 to avoid unduly enlarging these FIGS.) Furthermore, initial lead 11 does not have bridge portions 17 between itself and central opening 10'. This renders initial lead 11 more unstable to lateral displacements (in particular, in the radial direction with respect to the central axis) compared to the other leads. Because of this, small accidental displacements of initial lead 11 toward center axis O can cause it to enter central opening 10' of the stator stack. Such a situation can cause a physical interference of the initial lead 11 with the rotor that is destined to rotate in central opening 10'. A frequent consequence of this is damage to the initial lead.

In view of the foregoing, it would be desirable to provide improved methods and apparatus for winding undulated coils for dynamo-electric machine stators. It would also be desirable to provide methods and apparatus for winding undulated coils for dynamo-electric machine stators that reduce the likelihood of damage to lead wires. It would further be desirable to provide an undulated coil whose wire leads are less susceptible to damage.

SUMMARY OF THE INVENTION

It is an object of this invention to provide improved methods and apparatus for winding undulated coils for dynamo-electric machine stators. It is also an object of this invention to provide methods and apparatus for winding undulated coils for dynamo-electric machine stators that reduce the likelihood of interference between lead wires and rotors of dynamo-electric machines. It is a further object of this invention to provide an undulated coil whose wire leads are less susceptible to damage.

These and other objects are accomplished by providing a wire coil winding head which includes, among other features, a gripper configured to hold an initial lead of the wire; a receiver structure configured to receive the wire extending from the gripper and to form a coil of the wire having successive turns that are substantially disposed in respective planes that are substantially perpendicular to a central longitudinal axis of the coil and laterally spaced from one another along that axis; a forming structure configured to produce undulations in the turns of wire in their respective planes while the turns are on the receiver structure, the undulations giving the turns portions that are substantially radial of the axis; and a gripper positioning structure configured to position the gripper relative to the receiver structure so that the initial and final leads can be placed substantially in the same plane as each other and each lead can also be substantially aligned with a respective portion of the coil that is substantially radially disposed with respect to the longitudinal axis. Accordingly, the invention permits both initial and final leads, as installed in a stator, to be disposed at a safe distance from the rotor destined to rotate within the stator.

DETAILED DESCRIPTION OF THE PREFERRED EMBODIMENTS

Figure 1:
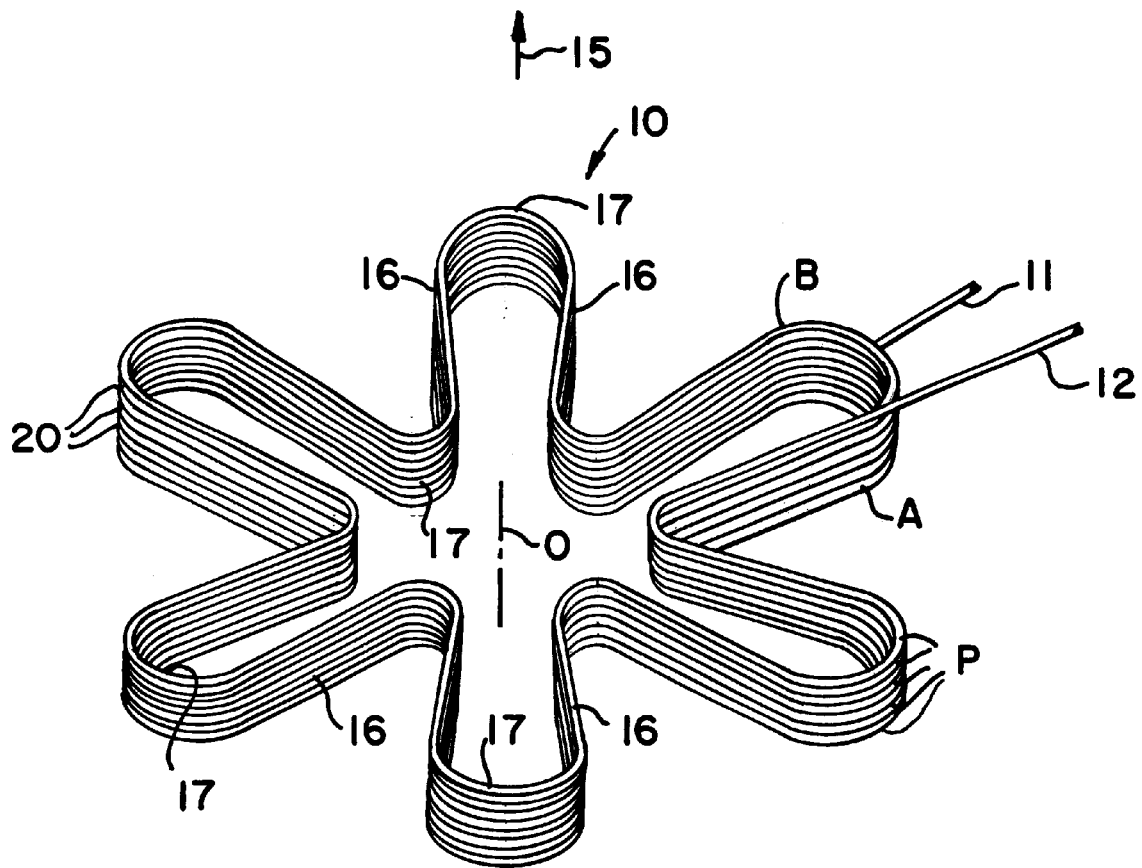
FIG. 1 is a perspective view of a traditional undulated coil showing initial and final leads disposed on opposite faces of the coil
Figure 2:
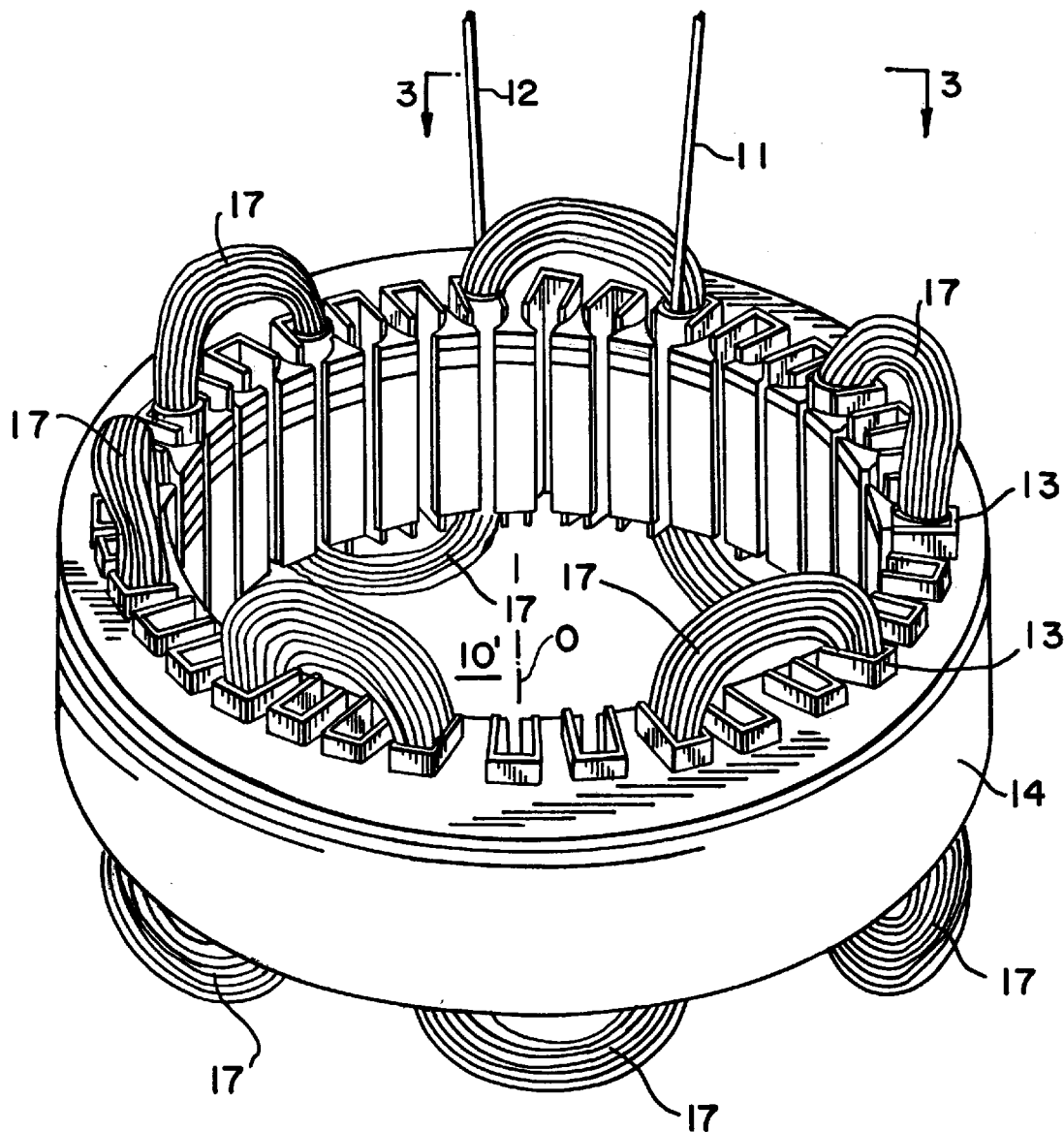
FIG. 2 is a perspective view of the undulated coil of FIG. 1 inserted in a stator stack.
Figure 3:
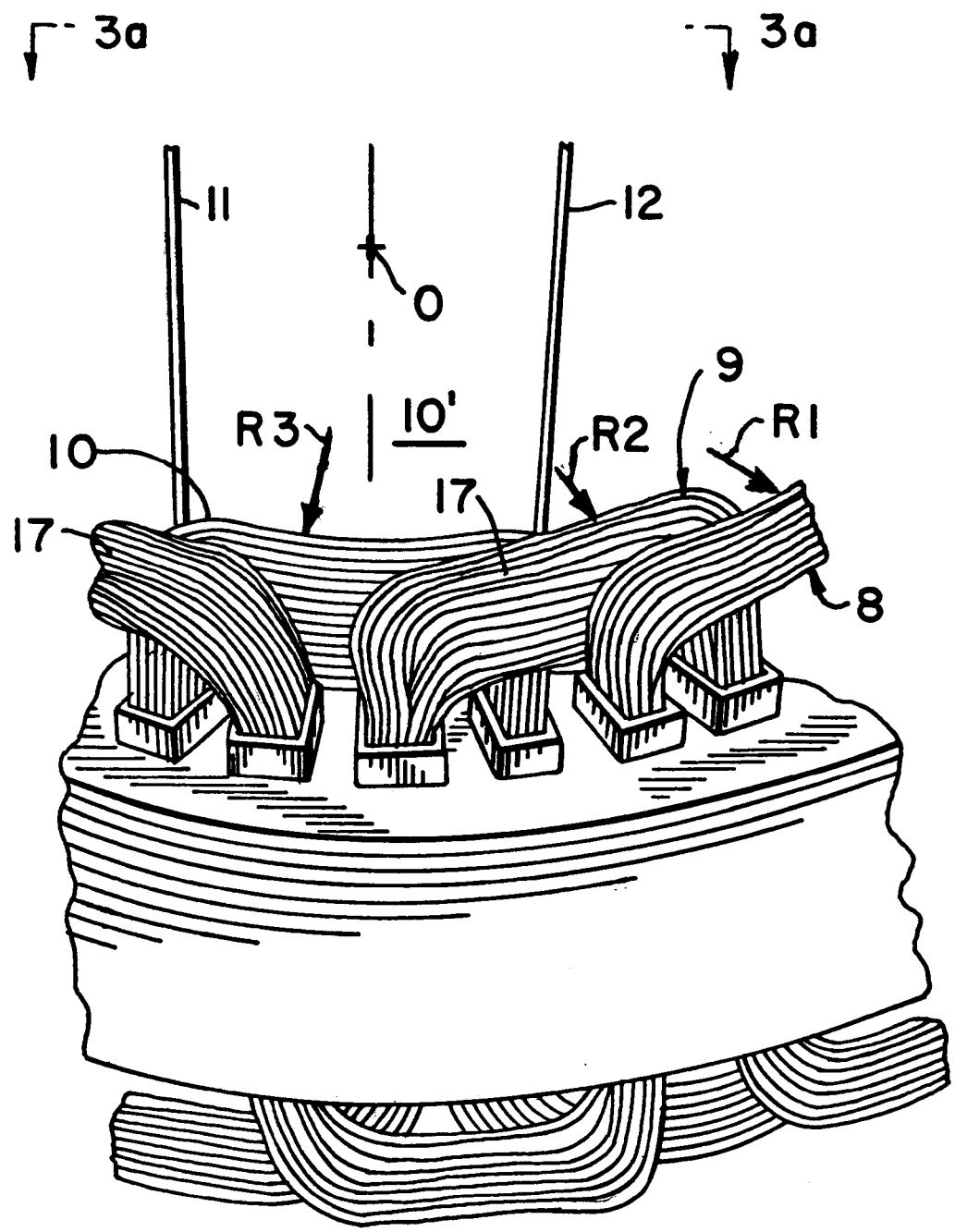
FIG. 3 is a partial perspective view of the stator stack of FIG. 2 loaded with three undulated coils as viewed from the direction 3—3 in FIG. 2.
Figure 3A:
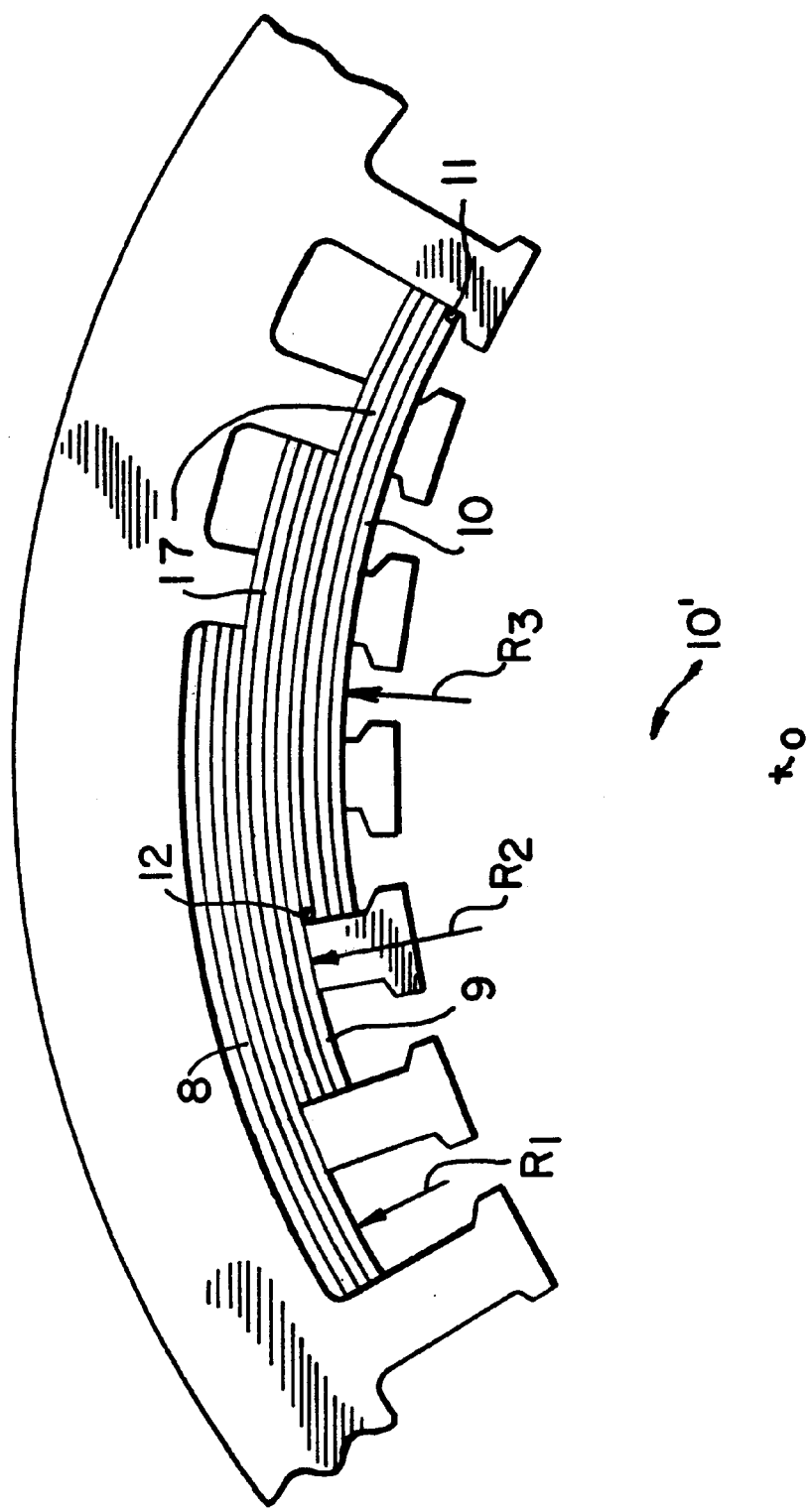
FIG. 3a is a partial top plan view of the loaded stator of FIG. 3 as viewed from the direction 3a—3a in FIG. 3.
Figure 4:
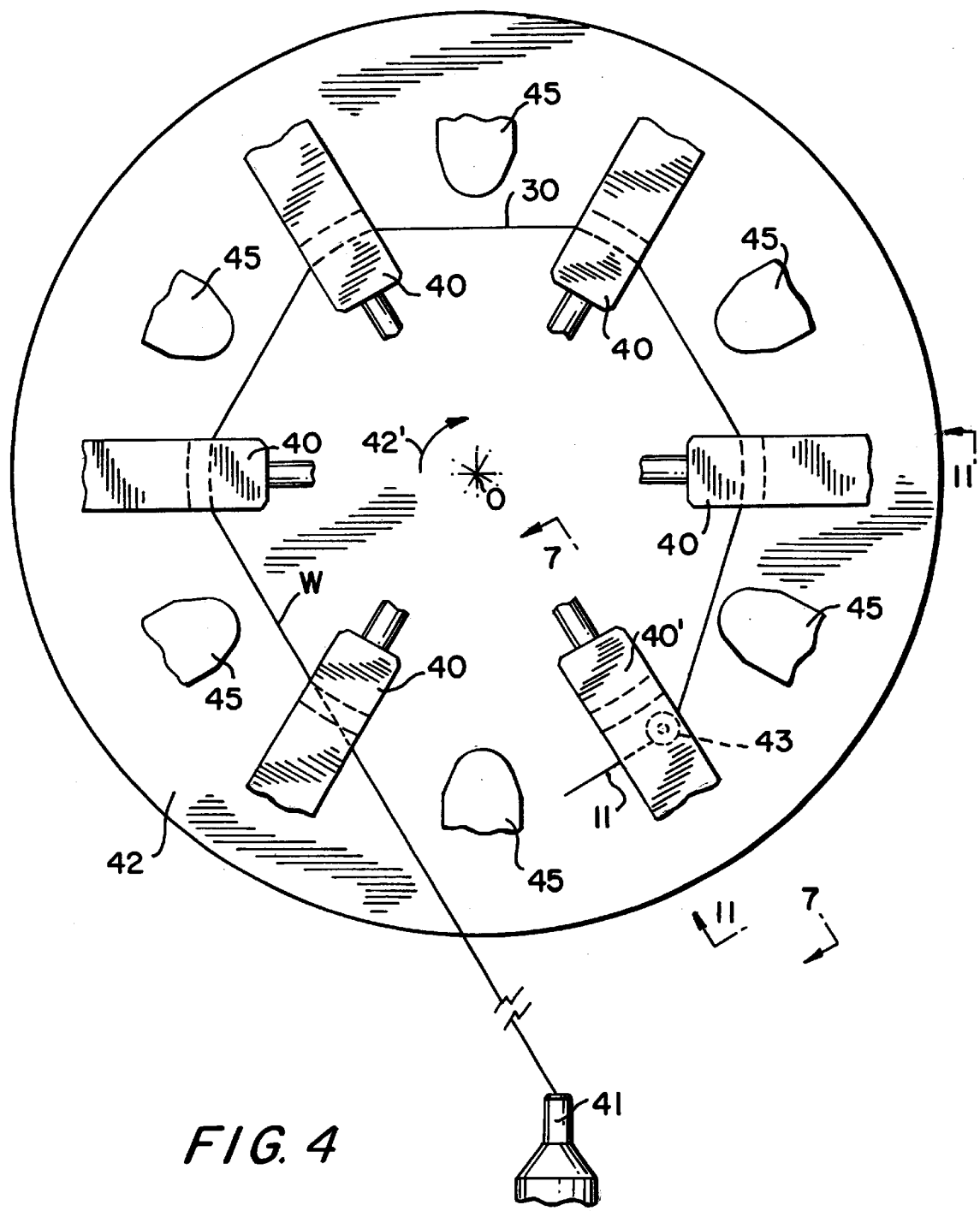
FIG. 4 is a top plan view of a winding head for winding an undulated coil according to the principles of the invention.

FIG. 4 shows an apparatus for forming an undulated wire coil according to the principles of the invention. Wire gripper 43 secures the end of a wire W to forming member 40' of support structure 42. Support structure 42 is a winding head according to Barrera '376, although modified according to this invention, and carries a plurality of forming members 40 that are arranged in a polygon.

Support structure 42 is rotated around axis O while initial lead 11 is gripped by gripper 43. Wire W is thus pulled from the source and wound on forming members 40 to accumulate a plurality of polygonal wire turns that, together, form a polygonal coil. During rotation of support structure 42, wire W is guided toward the winding head by stationary wire feeding guide 41, which is preferably a nozzle. The end of wire W becomes initial lead 11 of initial wire turn 30.

Figure 5:
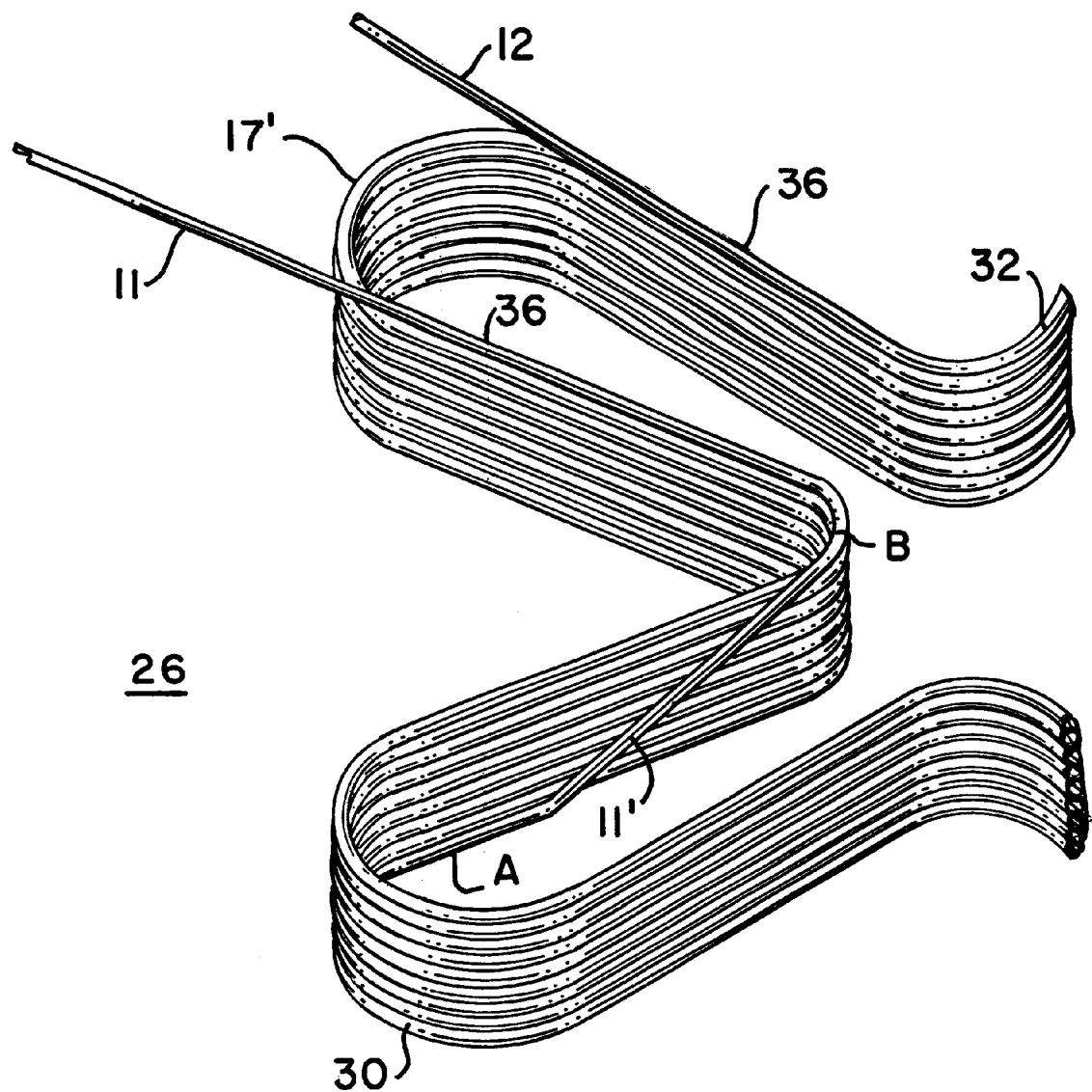
FIG. 5 is a partial perspective view of a coil wound according to the invention.

A second plurality of forming members 45 is also present on support structure 42, external to the polygonal wire coil formed on forming members 40. Forming members 45 can push inwardly on the lateral segments, or sides, of the polygonal wire coil. This pushing action, together with a simultaneous radial movement of the forming members 40 toward central axis O, produces undulations in a coil, for example coil 26, as shown in FIG. 5.

After undulations have been formed, initial lead 11 is released from gripper 43 and wire W is severed from the source wire to form final wire lead 12. Final wire lead 12 extends from final wire turn 32 and is arranged in plane B with initial lead 11. Then, coil 26 is stripped off forming members 40 to be placed on an insertion tool (not shown) for successive insertion into the stator stack with initial and final leads, 11 and 12, respectively, substantially equidistant from central axis O as shown in FIG. 6.

Figure 6:
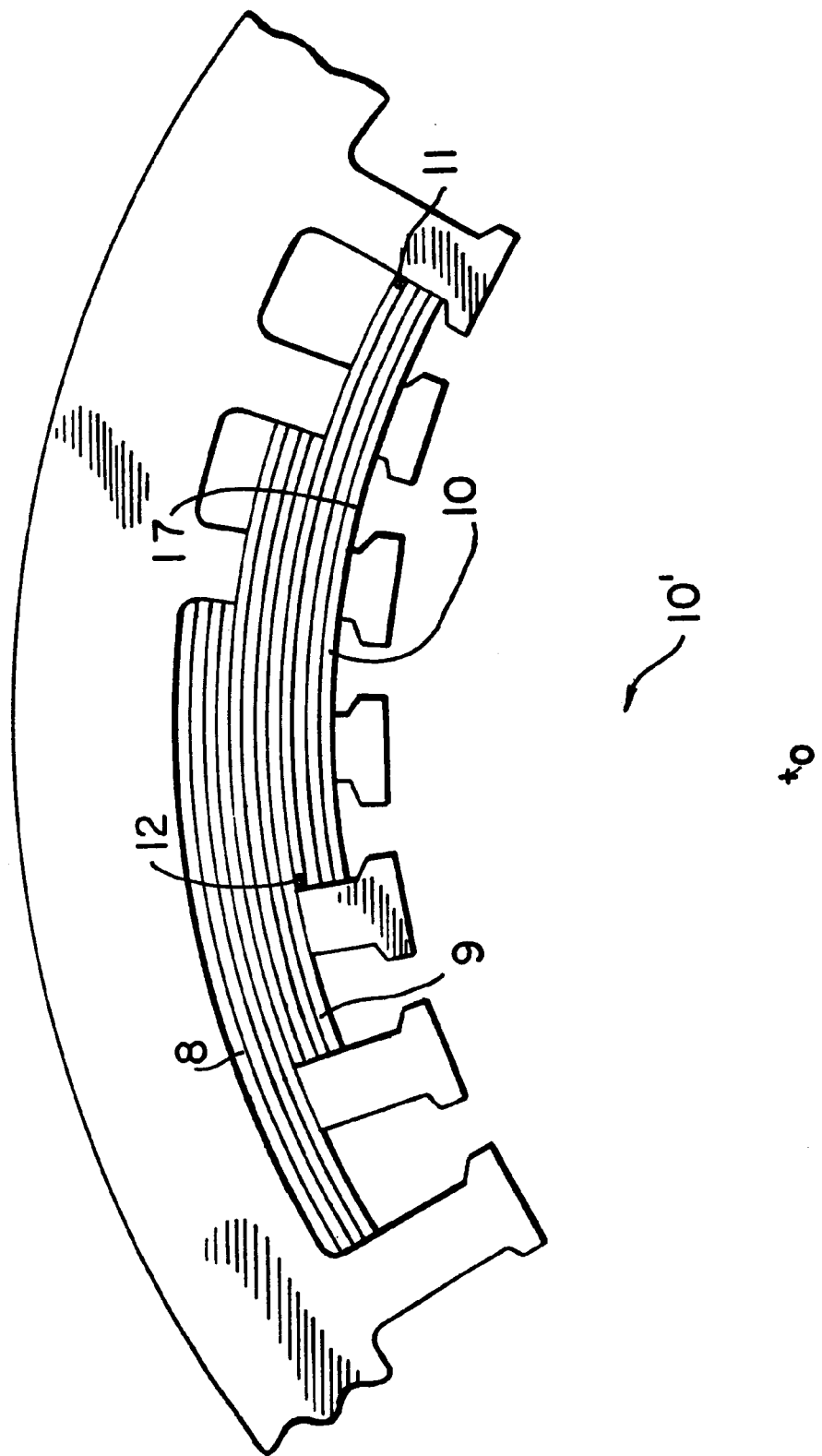
FIG. 6 is a partial top plan view of a stator similar to that of FIG. 3a, but having been loaded with the undulated coil of FIG. 5.

From FIG. 6 it is evident that initial lead 11 is more exterior with respect to opening 10' than its counterpart in the prior art discussed above. Also, lead 11 has bridge portions 17 between itself and opening 10'. These conditions make initial lead 11 less vulnerable to displacements that would bring it into or over interior opening 10'.

Figure 7:
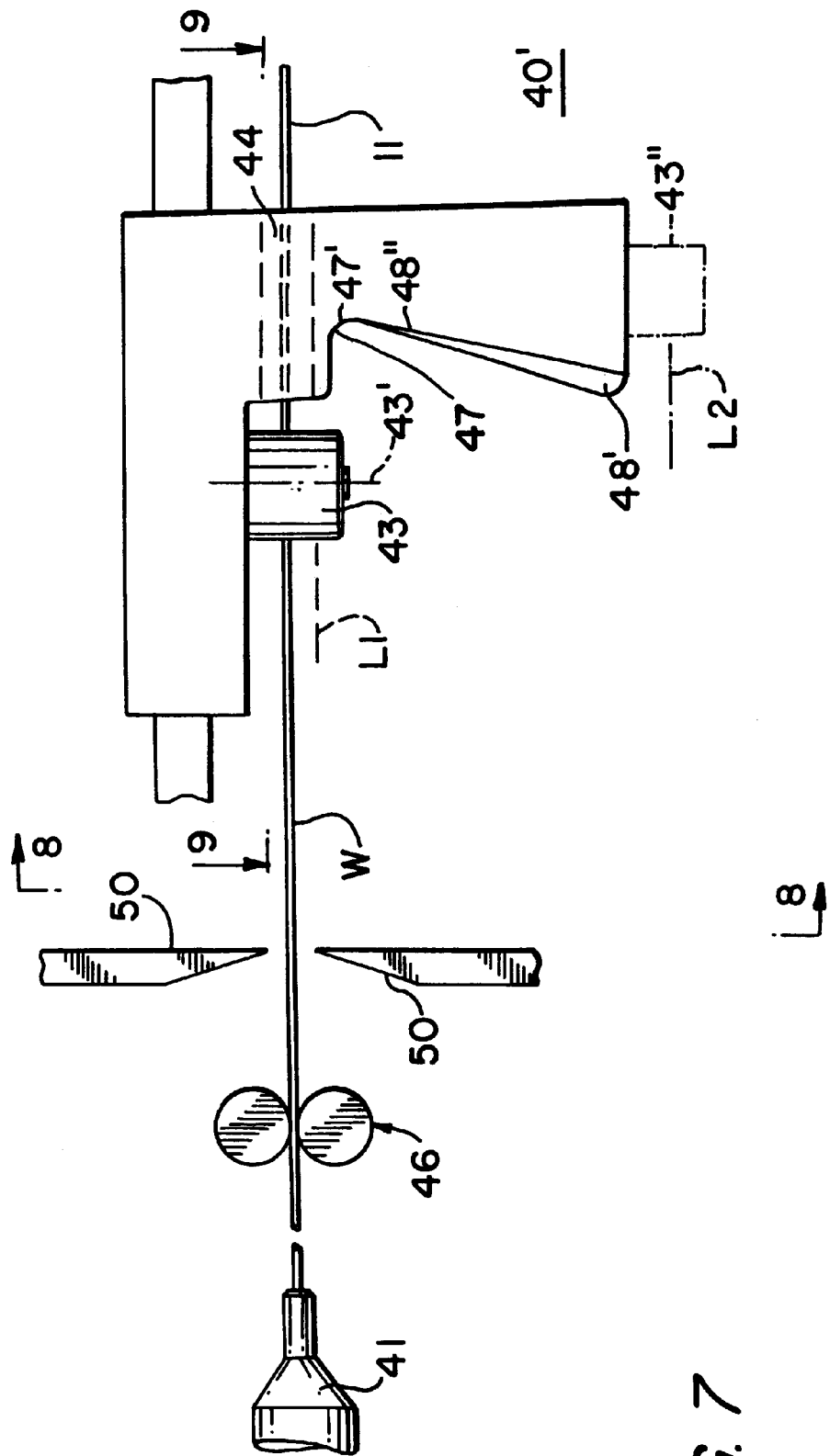
FIG. 7 is a side elevational view from direction 7 of FIG. 4 showing the forming member of the winding head of FIG. 4 that is provided with an implementation of the invention.

The formation of a coil such as coil 26 will now be explained in greater detail with reference to FIGS. 7–11. FIG. 7 is a view along 7—7 of FIG. 4, showing forming member 40' with an implementation of this invention at the initial loading stage. According to the principles of this invention, gripper 43 has been placed at level L1 of forming member 40'. Prior to this invention, a gripper was located at level L2, as shown by the dashed line representation of the gripper's contour, referenced 43". Additionally, forming member 40' is provided with initial lead aperture 44 adjacent gripper 43 for receiving initial lead 11 while gripper 43 grips initial lead 11.

Prior to winding a new coil, gripper 43 and initial lead aperture 44 are aligned with feed device 46 by means of a controlled and predetermined rotation of support structure 42. After alignment, feed device 46 pulls the end of wire W from the source and feeds it through gripper 43 and into initial lead aperture 44, as shown in FIG. 7.

Figure 8:
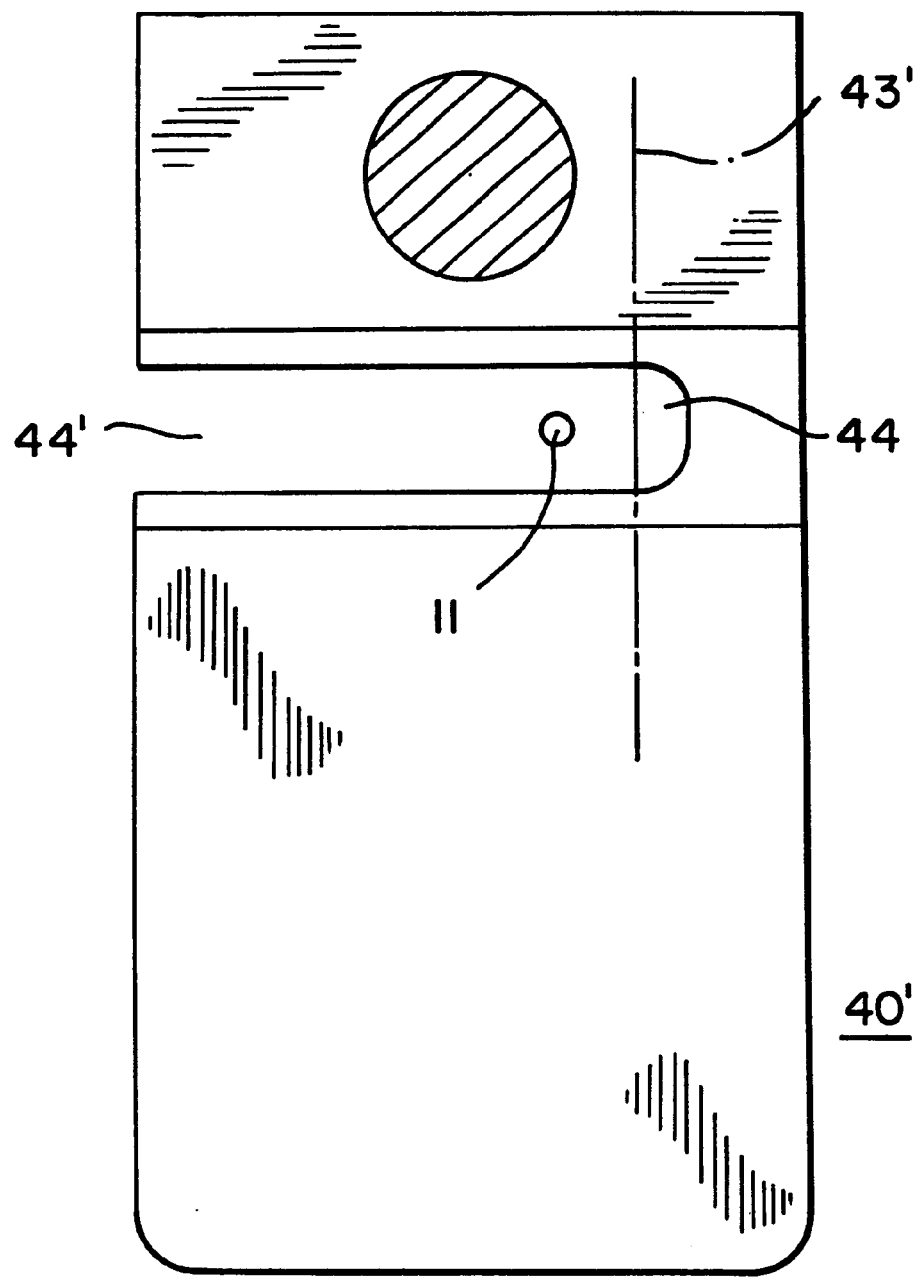
FIG. 8 is an elevational view of the forming member of FIG. 7 from direction 8—8 in FIG. 7.
Figure 9:
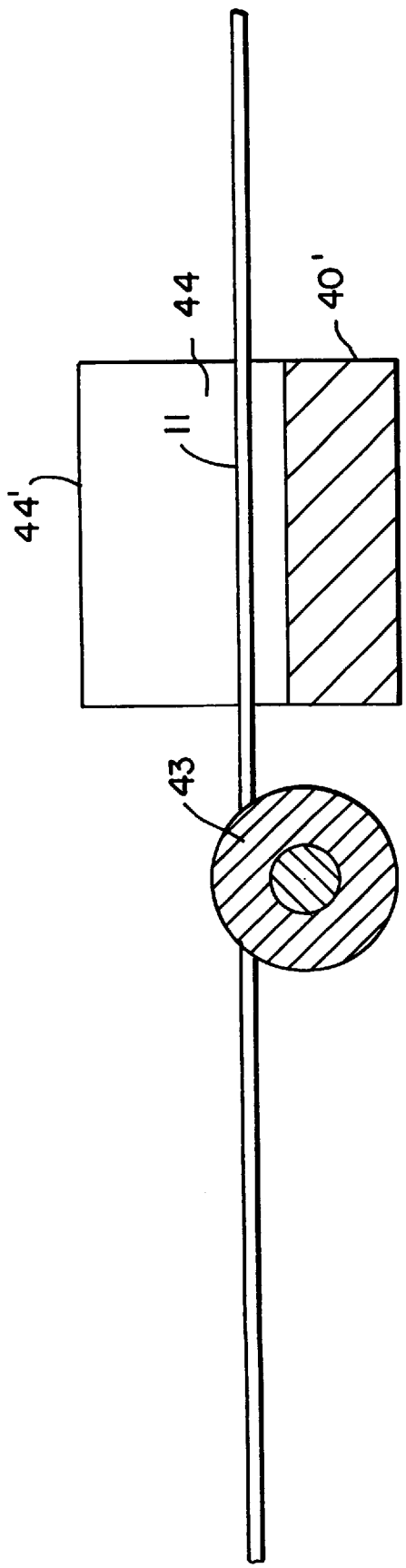
FIG. 9 is a cross-sectional view taken along the line 9—9 in FIG. 7 showing a wire engaged by a gripper and passing through an aperture of the forming member of FIG. 7.

FIG. 8 is a view from directions 8—8 of FIG. 7 showing that initial lead aperture 44 passes right through forming member 40'. Also evident from FIG. 8 is that initial lead aperture 44 has an open side 44'. Gripper 43 has been omitted in FIG. 8 to more clearly show initial lead aperture 44. However middle axis 43' of gripper 43 has been shown. FIG. 9 shows the initial position of initial wire lead 11 in initial wire lead aperture 44 along the line 9—9 of FIG. 7.

Figure 10:
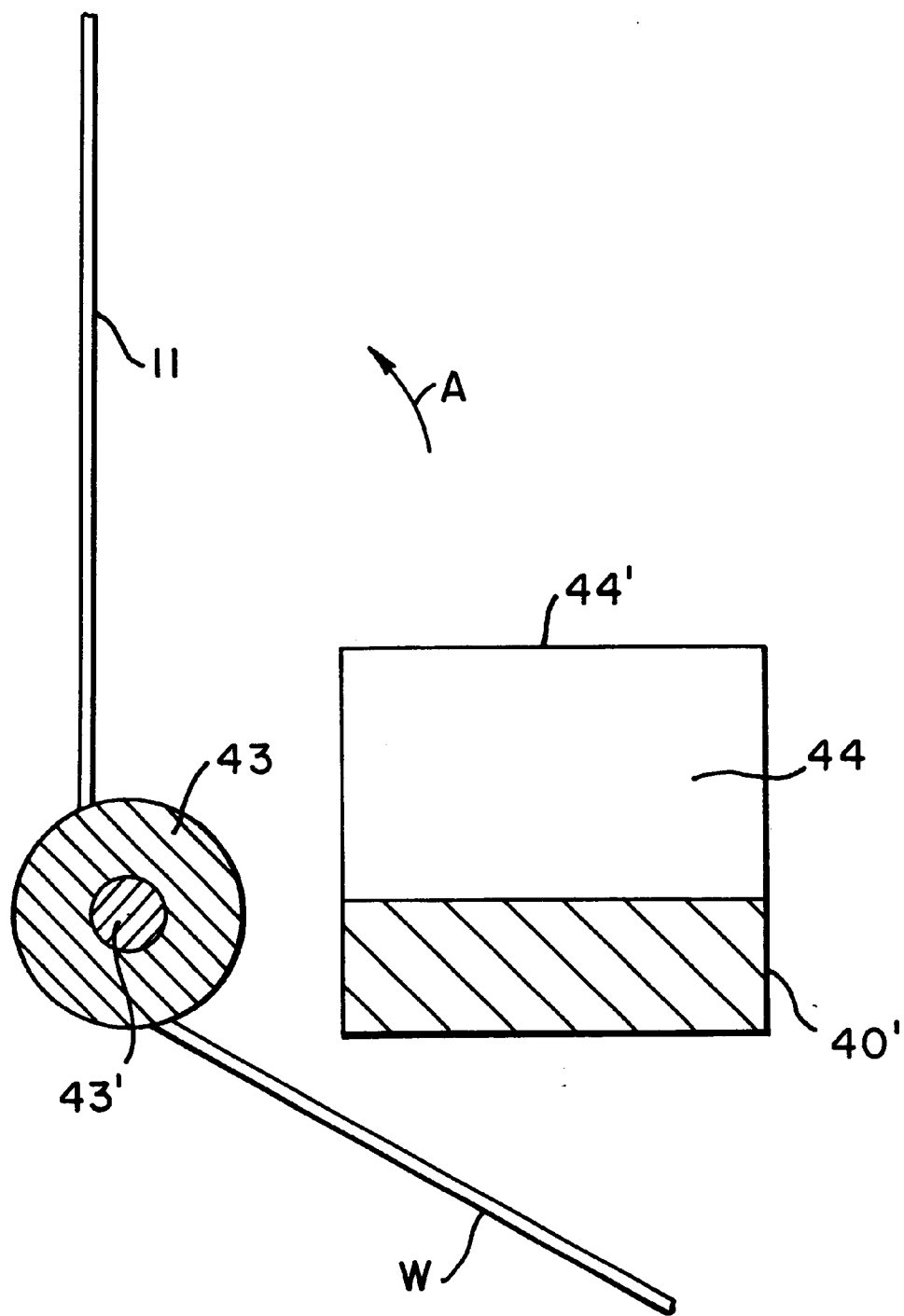
FIG. 10 is a cross-sectional view similar to FIG. 9 showing the wire, the gripper, and the forming member of FIG. 7 after the winding head of FIG. 4 has begun to rotate.

Once the end of wire W has been passed through initial lead aperture 11 and gripped by gripper 43, support structure 42 is rotated in direction 42'. FIG. 10 shows that as rotation of support structure 42 occurs, gripper 43 rotates around axis 43' due to torque from tension in wire W. The rotation of gripper 43 causes initial lead 11 to rotate, or pivot, about axis 43' (see arrow A in FIG. 10). Initial lead 11 moves substantially in a plane perpendicular to central axis O, passes laterally through open side 44', and rotates into an orientation tangential to an apex of the polygon form (resistance in the rotation of gripper 43 causes wire W to bend around gripper 43). Ultimately, as forming members 45 create undulations in the coil, initial lead 11 is aligned substantially parallel to radial arm 36 (see FIG. 5).

The side of forming member 40' on which open side 44' is disposed, and the corresponding side of gripper 43 on which initial lead 11 is gripped, depends on the direction of rotation of support structure 42. The side which has been shown here is consistent with direction 42' as chosen for the rotation of support structure 42.

Figure 11:
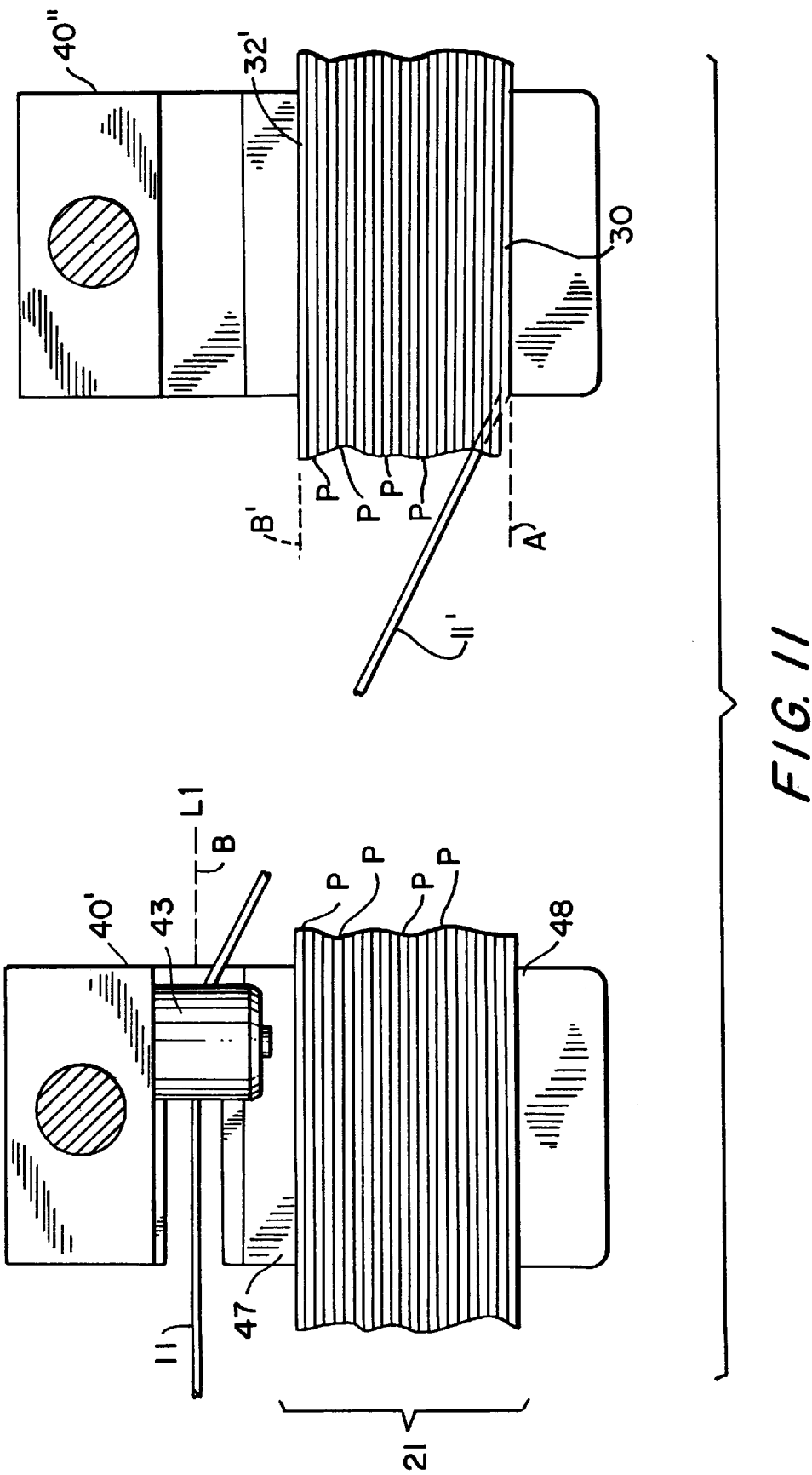
FIG. 11 is an elevational view along direction 11—11 of FIG. 4 showing wire turns disposed on the forming member of FIG. 7 and an adjacent forming member.

FIG. 11 is a view from direction 11—11 of FIG. 4 showing how the turns of the polygon coil dispose themselves. The wire for first turn 30, starting from initial lead 11, is deposited on forming member 40' and on immediately adjacent forming member 40". It is seen, with reference also to FIG. 7, that the wire just leaving the nozzle during rotation of support structure 42 is received by curved seats 47.

Curved seats 47 extend from slanted sides 48 of forming members 40. As additional turns are deposited, the additional turns are allowed to urge the previously wound turns in a progressive and orderly descent out of curved seats 47 and onto inner end portions 48" of slanted sides 48. As winding continues, wire turns are urged further downward along slanted side 48, toward outer end portions 48' until slanted sides 48 support a plurality of wire turns 21 shown in FIG. 11 (inner end portions 48" are radially closer to central axis O than are outer end portions 48').

Wire turns 21 form a helical coil that has turns that are placed on various planes P, including initial turn plane A and final turn plane B. The accumulation of wire turns 21 grows toward plane B as more turns are deposited. At any stage during the winding, last deposited wire turn 32' defines a last deposited turn plane, B', which is closer to initial turn plane A than is final turn plane B. Initial lead 11 in final turn plane B extends from gripper 43 to initial turn plane A on forming member 40" of FIG. 11, by means of slanted transitional wire portion 11'. When coil 26 is removed from support structure 42, initial wire lead 11 is placed flush against last deposited turn 32'. Consequently, planes B and B' merge with each other and last deposited turn 32' of FIG. 11 becomes final wire turn 32 of FIG. 6.

It will be appreciated that curved seats 47 have apices 47' that, taken together, define an apical plane substantially perpendicular to central axis O. Gripper 43 is disposed on one side of the apical plane and slanted sides 48 are disposed on the other side. This configuration permits initial lead 11 to be held adjacent the plane in which final lead 12 is destined to be deposited while turns 21 are accumulated. Initial lead 11 and final lead 12 can therefore be arranged in the same plane in the final coil.

After the helical coil is formed, forming members 45 form undulations as discussed above. Then, gripper 43 releases initial lead 11 so that coil 26 can be stripped off the winding head in order to transfer the coil to an insertion tool. As soon as initial lead 11 has been released, gripper 43 grasps the wire extending from the nozzle to final turn 32. Then, cutter device 50 of FIG. 7 cuts wire W between feed device 46 and forming members 40 to form final lead 12.

Cutter device 50 cuts wire W after forming member 40' is aligned with cutter device 50. More precisely, the side of forming member 40' which is opposite the side on which initial lead 11 is ultimately positioned will be aligned with cutter device 50. Like initial lead 11, final lead 12 of coil 26 is contained in plane B. Bridge portion 17' of the coil, between initial lead 11 and final lead 12 is formed by forming member 40', as shown in FIG. 5.

Figure 12:
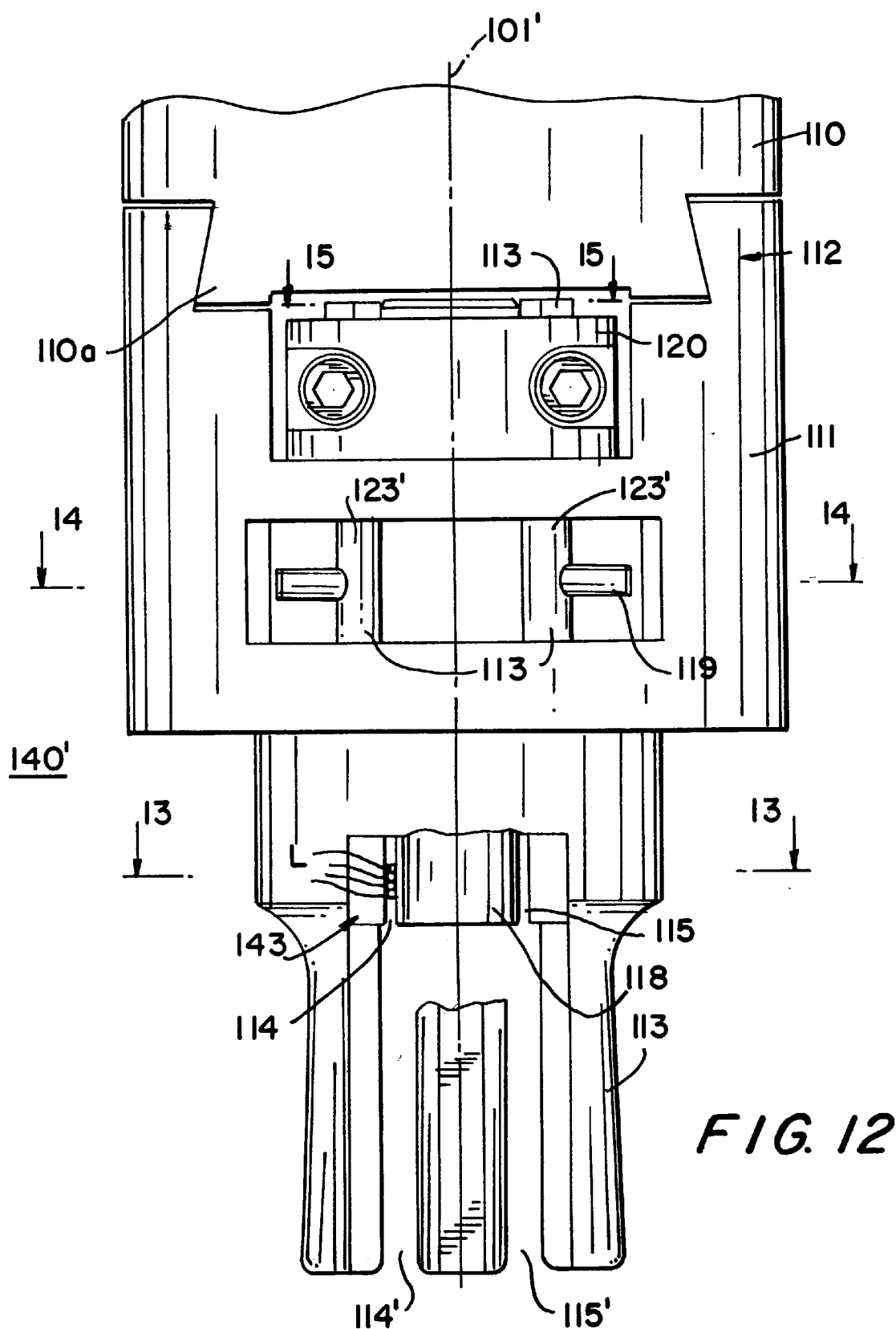
FIG. 12 is a simplified elevational view, partly in section, showing portions of an illustrative alternative embodiment of apparatus in accordance with the invention.

FIG. 12 shows an alternative illustrative embodiment of a forming structure 140', a gripper 143, and associated apparatus in accordance with the invention. The apparatus shown in FIG. 12 can take the place of forming structure 40' in FIG. 4, with the remainder of the apparatus shown in FIG. 4 being substantially unaltered if desired. FIG. 12 is an elevational view from the center (FIG. 4) of support structure 42.

Support member 110 is a portion of or is fixedly mounted on support structure 42 (FIG. 4). Support member 110 has a downwardly projecting dovetail key 110a on its lower surface. Key 110a extends radially relative to the center O of support structure 42 (FIG. 4). Forming structure 140' is mounted for movement along key 110a via a dovetail keyway 112 in the upper surface of a main body portion 111 of forming structure 140'.

The actual coil-forming portion of forming structure 140' is the lower portion of structure 113 as viewed in FIG. 12. This portion of the structure (which extends up into main body portion 111) is supported by main body portion 111 and is selectively rotatable about axis 101' relative to the main body portion. The thus-rotatable elements (sometimes referred to generically or collectively by reference number 113) include shaft 118 and clamp structure 120, both described in more detail below. In addition to being generally rotatable with structure 113, vertically aligned shaft 118 is mounted for limited rotational motion relative to structure 113 about axis 101' as will be described in greater detail below.

Figure 14:
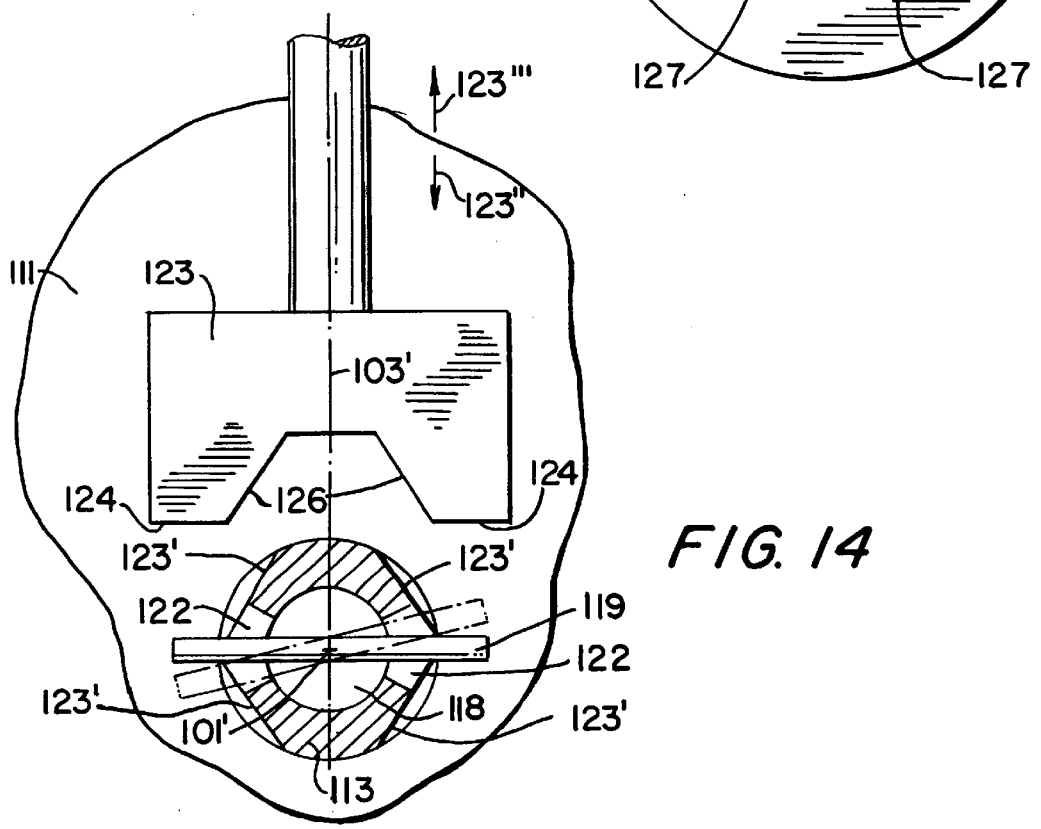
FIG. 14 is a simplified sectional view taken along the line 14—14 in FIG. 12.

Rotatable structure 113 may have a releasable detent connection (not shown) relative to main body portion 111 (e.g., to releasably hold rotatable structure 113 in the rotational orientation shown in FIG. 12). Rotatable structure 113 may also be releasably locked in this orientation (or in an operationally similar orientation 180° from the FIG. 12 orientation) by use of the features shown in FIG. 14. In particular, FIG. 14 shows that at the vertical location shown in that FIG. the outer surface of rotatable structure 113 includes surfaces 123' that are inclined relative to axis 103'. Locking block 123 is mounted in main body 111 for movement (e.g., by a hydraulic or pneumatic actuator which is not shown) along axis 103' toward (123") or away from (123'") rotatable structure 113. When rotatable structure 113 has the orientation (or approximate orientation) shown in FIG. 14 and locking block 123 is reciprocated toward axis 101', inclined surfaces 126 on locking block 123 engage with surfaces 123' on rotatable structure 113 and prevent rotation of structure 113 relative to main body 111. (Such reciprocation of locking block 123 also has another effect on the apparatus which will be described below.) When locking block 123 is retracted to the position shown in FIG. 14, locking block 123 releases structure 113 for rotation about axis 101'. Of course, structure 113 may also have the above-mentioned releasable detent association with main body 111 to releasably maintain structure 113 in a particular rotational orientation such as the one shown in FIG. 14 even when locking block 123 is not engaged.

Figure 13A:
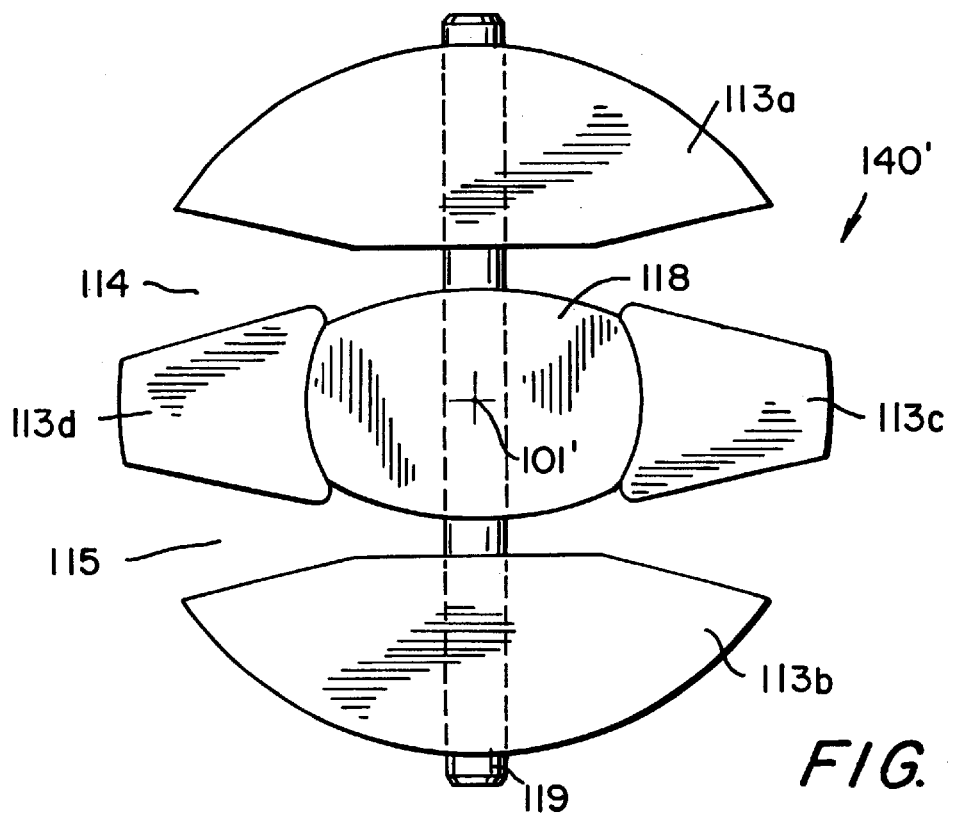
FIGS. 13a and 13b are simplified sectional views taken along the line 13—13 in FIG. 12 showing two different operating conditions of a portion of the FIG. 12 apparatus.
Figure 13B:
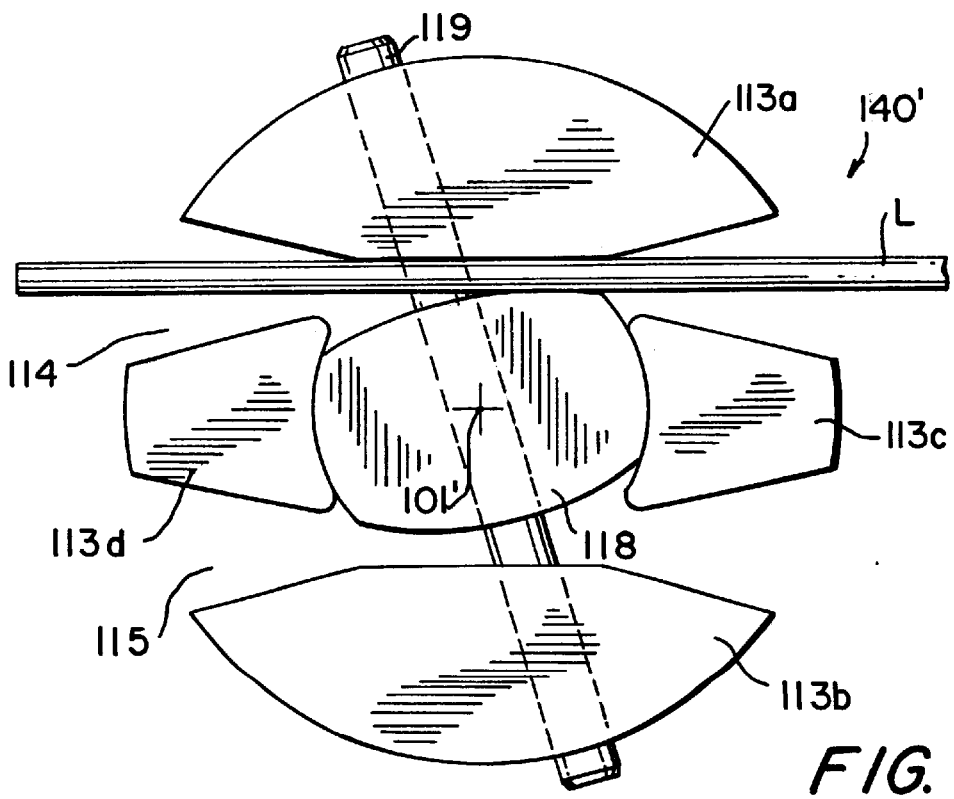

Shaft 118, which is vertically disposed in rotatable structure 113 substantially concentric with axis 101', has different exterior surface shapes at various locations along its length. As shown in FIGS. 13a and 13b, for example, the lower portion of shaft 118 has an elongated cross section. At this level in the apparatus (and also below this level) rotatable structure 113 is shaped to define four downwardly extending fingers 113a, 113b, 113c, and 113d disposed around shaft 118. (The pin 119 shown in dotted lines in FIGS. 13a and 13b is actually at a higher level in the apparatus as will be discussed in more detail below.) Fingers 113a–d and the side surfaces of shaft 118 cooperate to define two substantially parallel slots 114 and 115 that are vertically aligned and that extend across the lower portion of rotatable structure 113 on respective opposite sides of axis 101'. Below the lower end of shaft 118 slots 114 and 115 continue (as wider slots 114' and 115', respectively (see FIG. 12)) and open out the bottom of rotatable structure 113.

Returning to FIGS. 13a and 13b, at the level of the lower portion of shaft 118, it is seen that shaft 118 has an outer peripheral surface portion that has nonuniform spacing from axis 101' in a direction annularly around axis 101'. (Axis 101' substantially coincides with a central longitudinal axis of shaft 118.) At this level, slots 114 and 115 are wide enough when shaft 118 has the orientation shown in FIG. 13a to easily and relatively loosely receive a lead L (see FIG. 13b) of the wire to be wound. After a slot 114 or 115 has received such a lead L, shaft 118 can be rotated about axis 101' relative to structure 113 to the orientation shown in FIG. 13b to pinch the lead against the adjacent finger, or anvil structure, 113a or 113b and thereby securely hold the lead in the gripper portion 143 (FIG. 12) of forming structure 140'. Lead L can be released from gripper 143 by rotating shaft 118 back to the position shown in FIG. 13a. Lead L can be inserted in a slot 114 or 115 by extending the lead wire axially across the slot. Lead L is typically removed from a slot 114 or 115 by moving the lead downwardly via the associated slot 114' or 115' as the associated coil is stripped from forming structure 140' and the other forming structures of the apparatus.

Figure 15A:
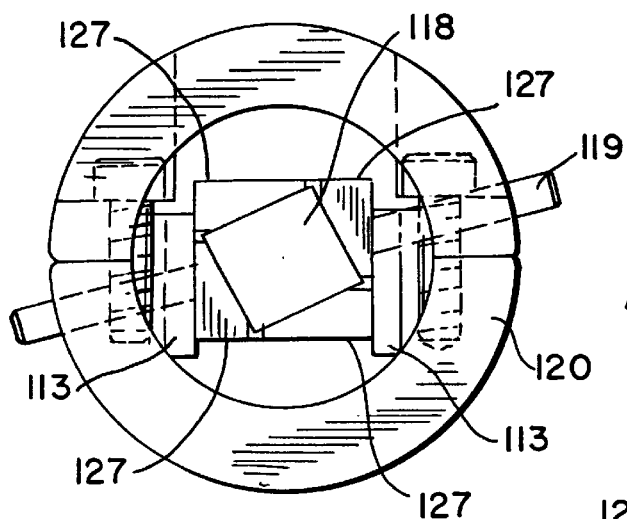
FIGS. 15a and 15b are simplified sectional views taken along the line 15—15 in FIG. 12 showing two different operating conditions of another portion of the FIG. 12 apparatus.
Figure 15B:
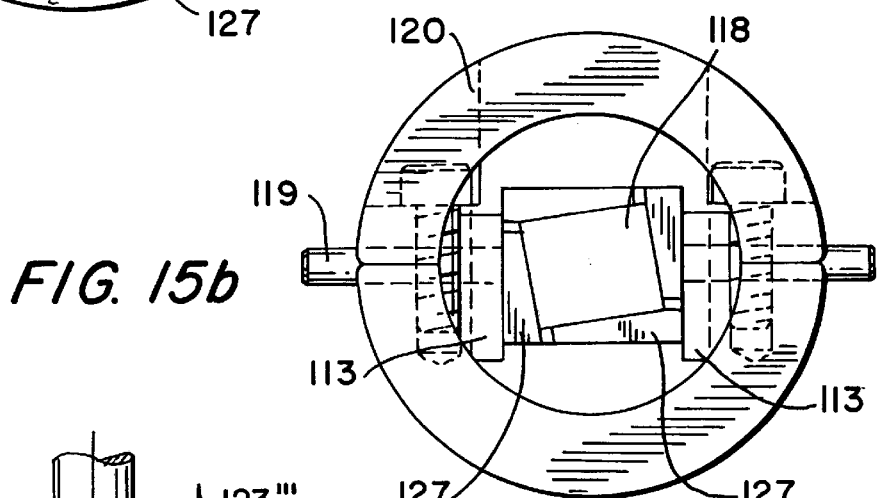

The elements that are used for rotationally positioning shaft 118 relative to rotatable structure 113 are perhaps best seen in FIGS. 14, 15a, and 15b, with the aid of FIG. 12. FIG. 14 has already been partly described, but it will now be further described with particular reference to pin 119 and related elements. Pin 119 extends transversely across shaft 118 and is fixedly mounted therein. At the level of pin 119, rotatable structure 113 has windows 122 which allow the ends of the pin to pass out through structure 113 without contacting structure 113 even when shaft 118 is rotated relative to structure 113. The "normal" position of pin 119 is the one shown in dotted lines in FIG. 14. This corresponds to the position of pin 119 shown in FIG. 13b and also in FIG. 15a.

When locking block 123 is reciprocated toward axis 101' as described earlier in connection with FIG. 14, surfaces 124 on locking block 123 contact the ends of pin 119 and rotate the pin about axis 101' from the dotted line position shown in FIG. 14 to the full line position shown in that FIG. This occurs while surfaces 126 and 123' are cooperating to prevent rotation of structure 113. Accordingly, rotation of pin 119 causes shaft 118 to rotate about axis 101' relative to structure 113.

At the level of the apparatus indicated by line 15—15 in FIG. 12 and accordingly shown in FIGS. 15a and 15b, shaft 118 has a square cross section. Blocks 127 of resilient material surround shaft 118 and are clamped between shaft 118 and upper portions of rotatable structure 113 by clamp structure 120. The relatively relaxed condition of blocks 127 is the condition shown in FIG. 15a. When shaft 118 is rotated to the position shown in FIG. 15b, blocks 127 are elastically deformed and exert torque on shaft 118 which resiliently urges the shaft to return to the position shown in FIG. 15a. Once again, the condition shown in FIG. 15b corresponds to the solid line position of pin 119 in FIG. 14 and the position of pin 119 in FIG. 13a. This is the condition in which locking block 123 in FIG. 14 has rotated pin 119 and therefore shaft 118 relative to structure 113. This is also the condition (shown in FIG. 13a) in which slots 114 and 115 are relatively open and therefore able to receive or release wire lead L. When locking block 123 is retracted from contact with pin 119 (as shown in FIG. 14), blocks 127 are able to rotate shaft 118 (relative to structure 113) back to the condition shown in FIG. 15a. This corresponds to the dotted line pin 119 position shown in FIG. 14 and the condition shown in FIG. 13b. In this condition of the apparatus, blocks 127 resiliently urge shaft 118 to rotate relative to structure 113 to produce the clamping of lead L shown in FIG. 13b. This clamping can be released by again reciprocating locking block 123 (FIG. 14) toward axis 101' and thereby rotating pin 119 back to the full line position shown in FIG. 14 (corresponding to the condition shown in FIGS. 13a and 15b).

In connection with FIG. 12 it should be noted that the lead-clamping region of the apparatus is preferably deep enough to clamp several wire leads L if desired. Four leads L are shown in FIG. 12 by way of illustration.

Figure 16:
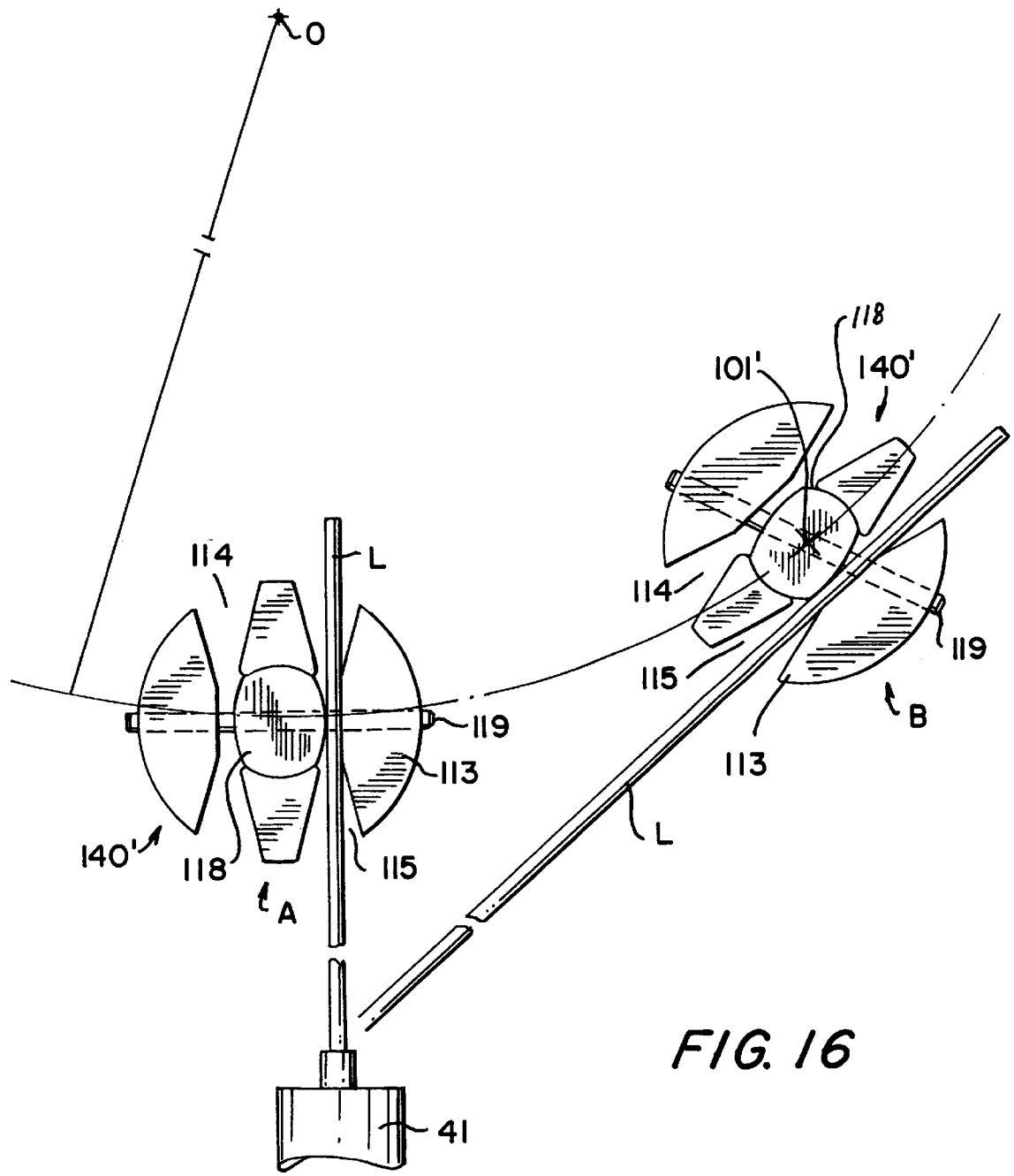
FIG. 16 is a view similar to FIG. 13a or 13b, but showing two different operating positions and conditions of a portion of the apparatus.

FIG. 16 shows additional aspects of the operation of forming structure 140'. When forming structure 140' is in the "A" location relative to wire feeding guide 41, slot 115 is aligned with wire emanating from guide 41. Slot 115 is also open to receive wire. Accordingly, wire can be axially extended from guide 41 (e.g., by elements such as 46 in FIG. 7) to enter slot 115 as shown on the left in FIG. 16. Forming structure 140' can then be operated (as described in the immediately preceding paragraphs) to clamp wire lead L in slot 115. Support structure 42 (FIG. 4) can then be rotated relative to guide 41 to cause forming structure 140' to begin to pull additional wire from guide 41 as shown in FIG. 16 by the movement of forming structure 140' from the "A" position shown on the left to the "B" position shown on the right. Because slot 115 does not pass through rotational axis 101', the use of forming structure 140' to pull wire from guide 41 causes the resulting tension in the wire to exert a rotational torque (about axis 101') on forming structure 140'. Because locking block 123 is in the retracted position shown in FIG. 14 after lead L has been inserted in slot 115 and clamped therein, this tension in the wire causes forming structure to rotate approximately 90° about axis 101' as it moves from the "A" position in FIG. 16 to the "B" position in that FIG. Shaft 118 rotates with the remainder of structure 113 and therefore continues to clamp the wire after forming structure leaves the "A" position shown in FIG. 16.

Figure 17:
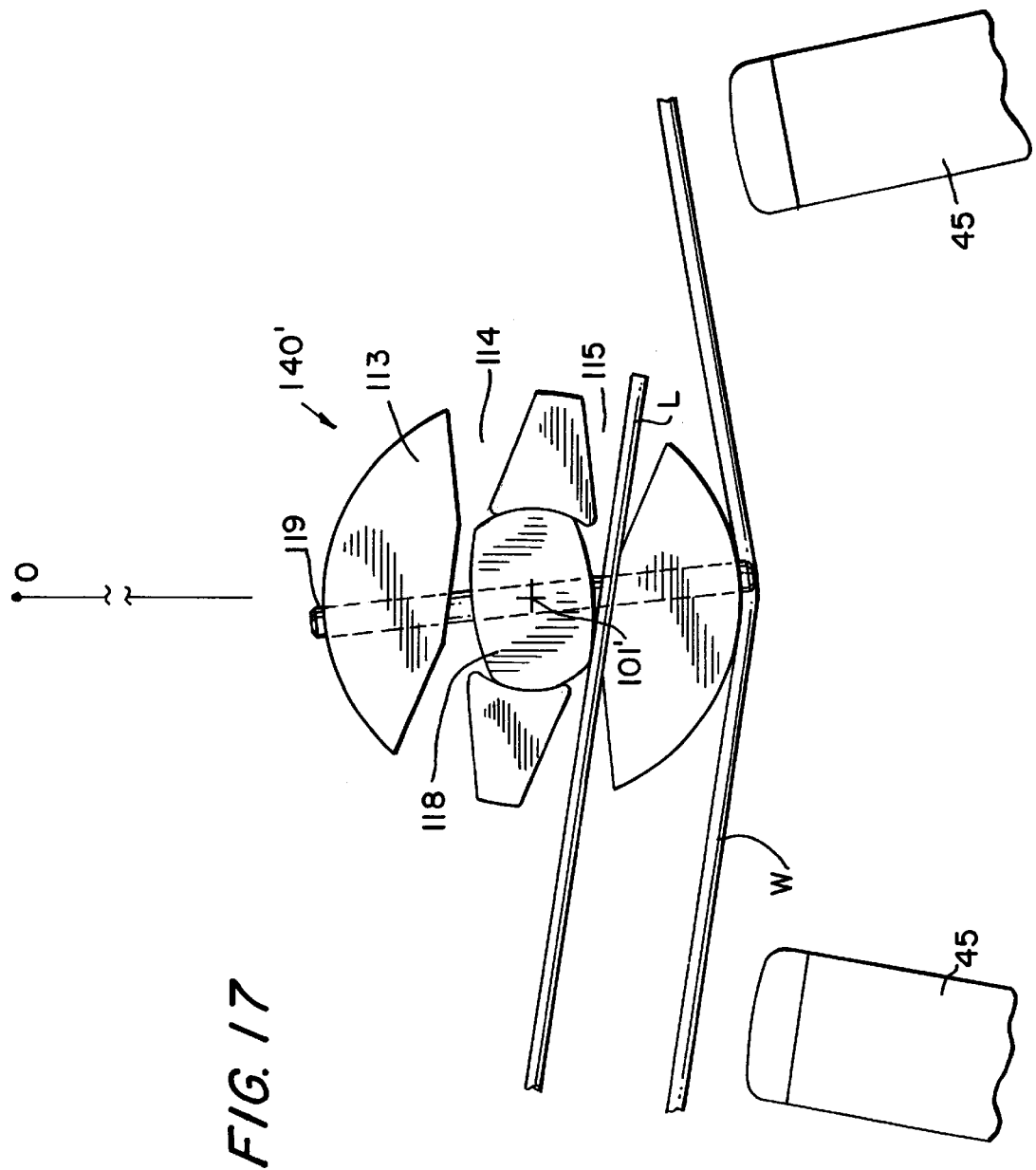
FIG. 17 is a view similar to FIG. 16 showing a later stage in the operation of the apparatus.

After the "B" condition shown in FIG. 16 is reached, support structure 42 (FIG. 4) continues to rotate relative to guide 41, drawing additional wire from the guide and causing that wire to deposit in a coil on forming structure 140' and the other forming structures 40 as described earlier in this specification (see also FIG. 17, which shows wire W that has been deposited around forming structure 140'). The shape of the outer surface of the lower portion of rotatable structure 140' (on which the turns of wire forming this coil are partly deposited) is generally like the shape described earlier for surfaces 47/48 (FIG. 8), except that in forming structure 140' this shape is "in the round" or a surface of revolution, concentric with axis 101'. Forming structure 140' therefore operates on the coil in the manner generally described earlier, and it operates in this manner regardless of its rotational orientation about axis 101'.

Figure 18:
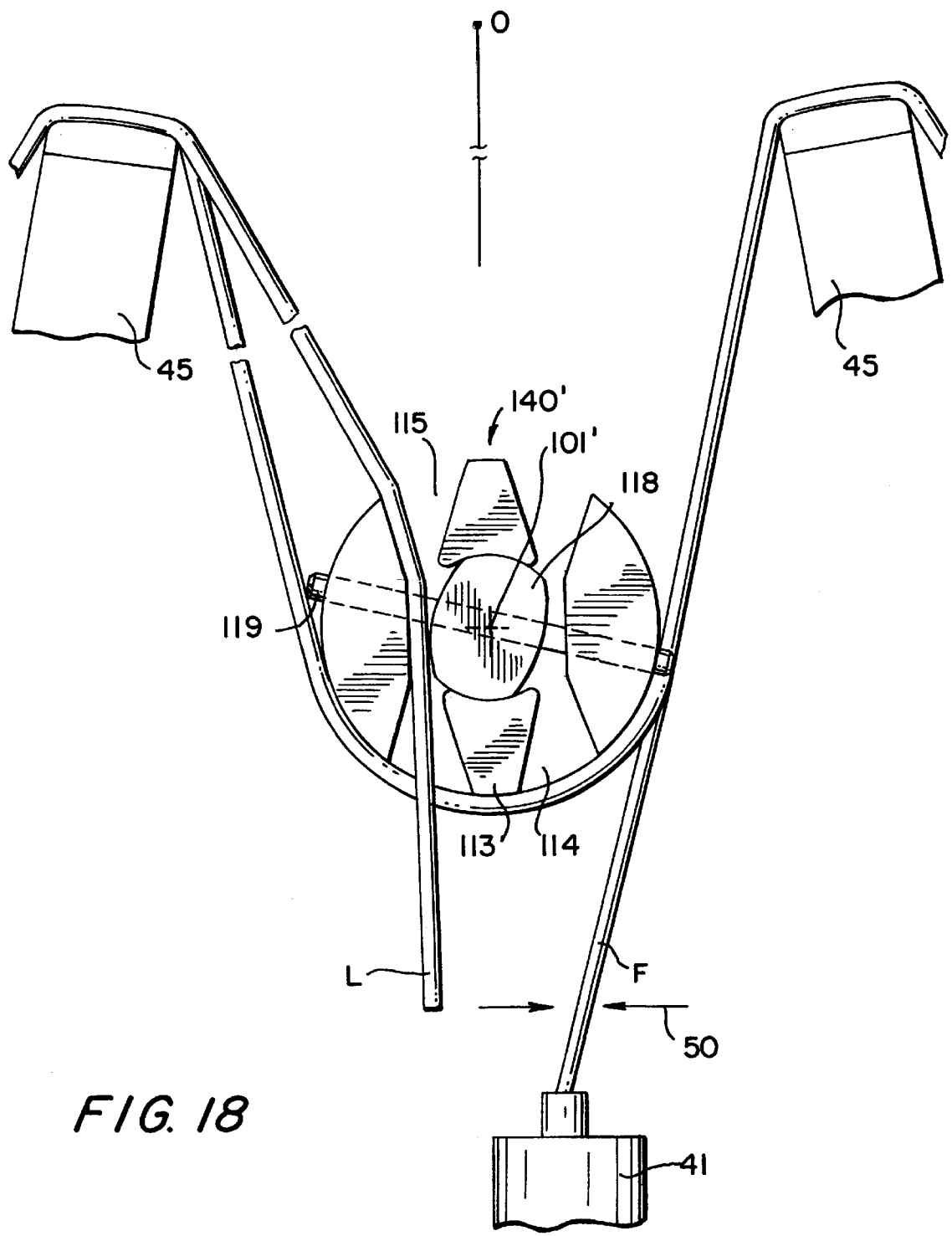
FIG. 18 is another view similar to FIG. 17 showing a still later stage in the operation of the apparatus.

After the desired number of wire turns have been deposited on forming structures 40 and 140', rotation of support structure 42 is stopped with forming structure 140' again adjacent to wire guide 41. Forming members 45 are then moved radially inward as shown in FIG. 18 to produce undulations in the coil of wire. Forming structures 40 and 140' may also move radially inward to a lesser extent. The radially inward motion of forming members 45 pulls in on lead L, which is still gripped by forming structure 140'. This produces a torque on forming structure 140', which causes it to again rotate about axis 101' by approximately 90° to the position shown in FIG. 18. Finish lead F is then cut by cutter 50. The coil is now ready to be stripped off forming members 40 and 140'. Accordingly, shaft 118 is rotated to release start lead L and the coil is stripped off the forming members and further processed to place it on a stator as described earlier in this specification. Elements 40, 45, and 140' are thereafter returned to their radially outer positions.

It will be noted in FIG. 18 that slot 114 in forming structure 140' is now opposite guide 41. A new start lead can therefore be fed into slot 114 (e.g., by elements like elements 46 in FIG. 7). The rotation of shaft 118 can then be released in order to clamp this new start lead and the above-described coil winding process can begin again. Slots 114 and 115 are thus used alternately in successive coil winding operations.

Because gripper 143 for start lead L is located near the top of the structure on which the turns of wire are formed and gradually moved down, the start and finish leads L and F in FIG. 18 are in approximately the same transverse plane of the finished coil. The apparatus shown in FIGS. 12–18 therefore produces coils having the same characteristics and advantages as are described above for the coils and apparatus shown in FIGS. 4–11.

In some applications of the invention it may be desirable to be able to produce some coils with start and finish leads in the same transverse plane (as described above), and to produce other coils with start and finish leads in respective start and finish planes that are spaced from one another at respective opposite axial ends of the finished coil. If that is desired, the apparatus of this invention can include a second forming structure generally like 40' or 140' but with the gripper for the start lead farther down and therefore able to hold the start lead in a plane different from the plane in which the finish lead will be disposed. When it is desired to produce a coil with co-planar start and finish leads, the coil is started using the forming structure 40' or 140' with the higher start lead gripper 43 or 143. When it is desired to produce a coil with start and finish leads in axially spaced transverse planes, the coil is started using the forming structure 40' or 140' with the lower start lead gripper 43 or 143. If forming structures of type 140' are being used, the above-mentioned anti-rotation detent (or, alternatively, engagement of locking block 123) prevents rotation of the forming structure that is not currently being used to grip the start lead.

Figure 19A:
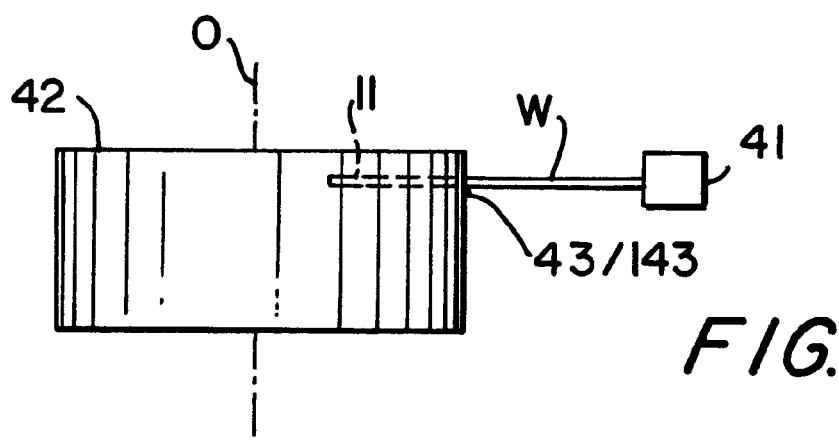
FIG. 19a is a simplified elevational view showing another illustrative alternative embodiment in accordance with the invention.
Figure 19B:
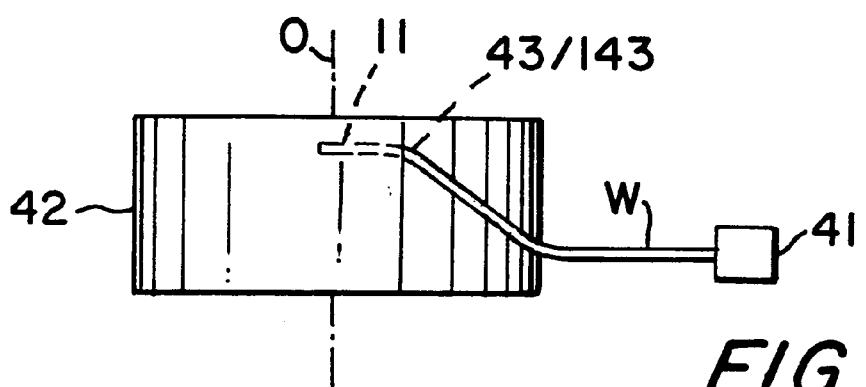
FIGS. 19b–d are views similar to FIG. 19a showing successive stages in the operation of the FIG. 19a embodiment.
Figure 19C:
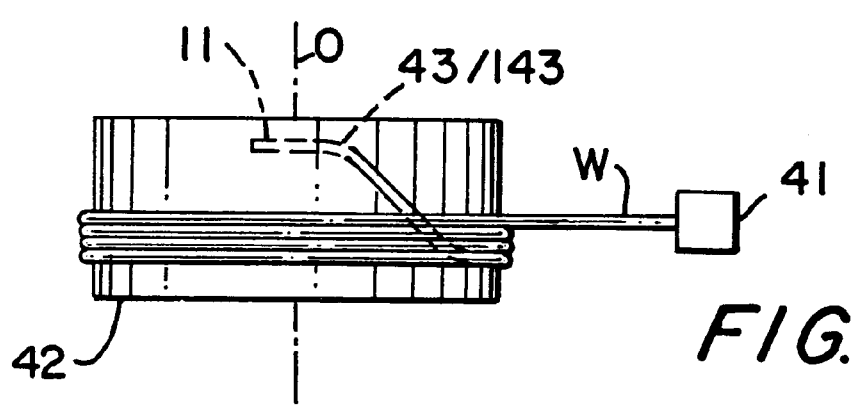
Figure 19D:
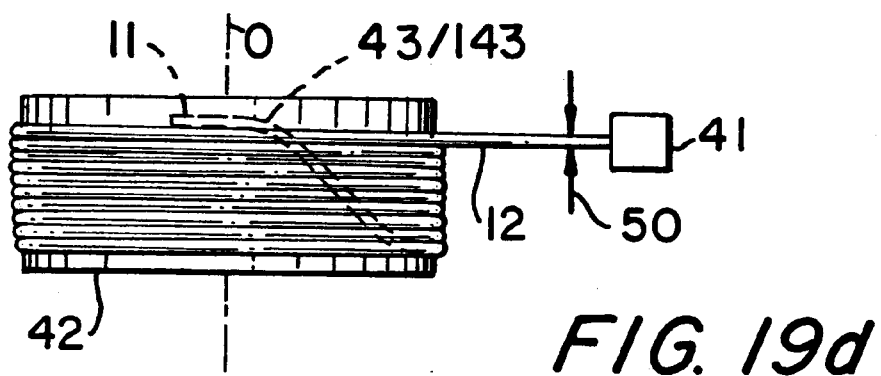

As another example of possible modifications within the scope of this invention, instead of elements 41 and 42 being substantially fixed in the vertical direction during the operations relevant to the invention, elements 41 and 42 can be relatively movable in the vertical direction as shown in the sequence of FIGS. 19a–d. In these FIGS. the entire wire-receiving and coil-forming structure is indicated generally by the reference number 42. As shown in FIG. 19a wire source 41 is initially relatively high relative to structure 42 so that initial lead 11 (or L in embodiments like those shown beginning with FIG. 12) can be gripped by relatively high gripper 43/143. As winding of the coil begins, wire source 41 moves down relative to structure 42 as shown in FIG. 19b. Thereafter, as winding continues, wire source 41 gradually moves up again relative to structure 42 as shown progressively in FIGS. 19c and 19d. Thus the turns of wire W are deposited on structure 42 from the bottom to the top of that structure. The final turn is deposited in approximately the same relatively high plane in which initial lead 11 (or L) is held by gripper 43/143 throughout the winding operation. Final lead 12 is severed from wire source 41 by cutter 50. The coil undulation steps can be performed as described earlier in this specification and are not shown in the FIG. 19 series. Either or both of structures 41 and 42 can be moved to produce the relative vertical and rotational motions shown in FIGS. 19a–d. This type of embodiment can be used to avoid the need for successive turns of wire to slide down the coil forming surfaces as the turns are formed.

Figure 20A:
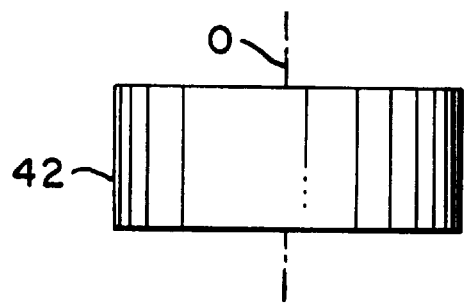
FIG. 20a is a simplified elevational view showing still another illustrative alternative embodiment in accordance with the invention.
Figure 20A:
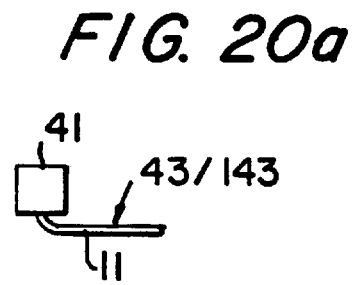
Figure 20B:
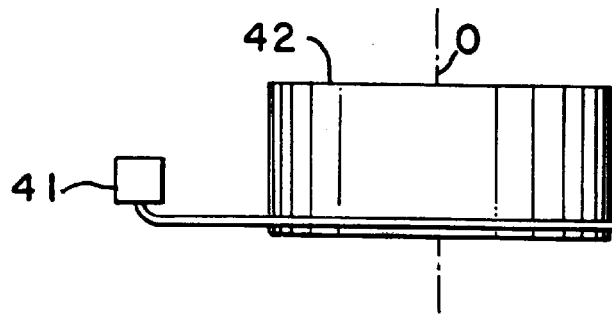
FIGS. 20b–e are views similar to FIG. 20a showing successive stages in the operation of the FIG. 20a embodiment.
Figure 20C:
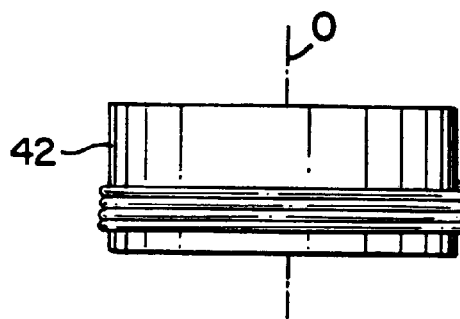
Figure 20D:
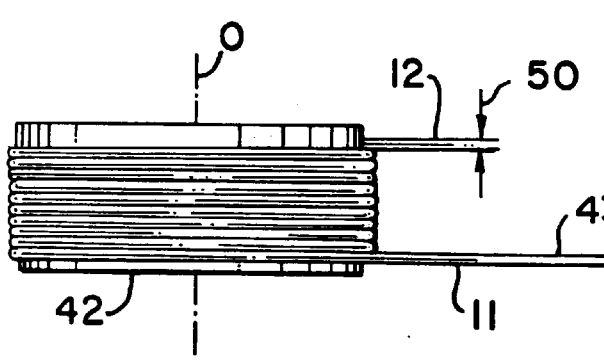
Figure 20E:
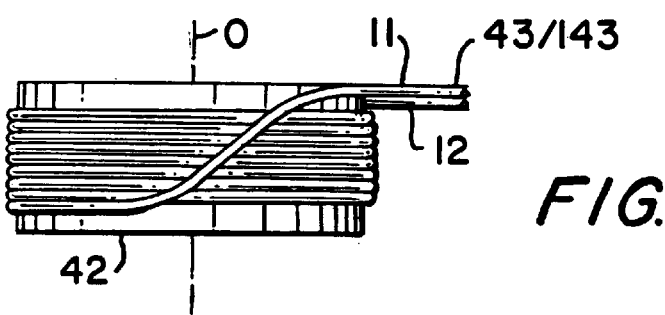

FIGS. 20a–e show another example of modifications within the scope of this invention. In this embodiment gripper 43/143 for initial lead 11 is movable vertically relative to wire-receiving and coil-forming structure 42. Gripper 43/143 is initially relatively low relative to structure 42 and receives and holds the end of wire from wire source 41 as shown in FIG. 20a. Wire source 41 is shown rotating around structure 42 and also gradually moving up relative to structure 42 as turns of wire are deposited on structure 42 (see FIGS. 20b, 20c, and 20d) The final turn of wire is severed from source 41 by cutter 50 as shown in FIG. 20d to produce final lead 12 in a relatively high, final turn plane. Gripper 43/143 then moves up relative to structure 42 to place initial lead 11 in approximately the same plane as final lead 12. The coil undulation steps can be performed as described earlier in this specification and are not shown in the FIG. 20 series. Any of elements 41, 42, and 43/143 can be moved vertically to produce the relative vertical movements shown in FIGS. 20a–e. Additionally, any of elements 41, 42, and 43/143 can be rotated about central axis O to wind wire onto structure 42.

Figure 21A:
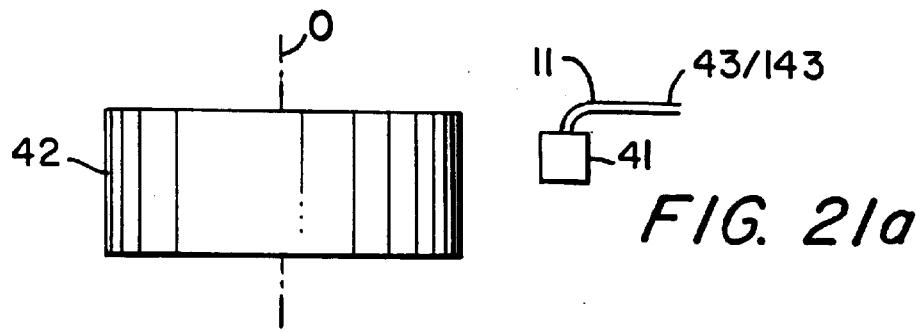
FIGS. 21a is a simplified elevational view showing yet another illustrative alternative embodiment in accordance with the invention.
Figure 21B:
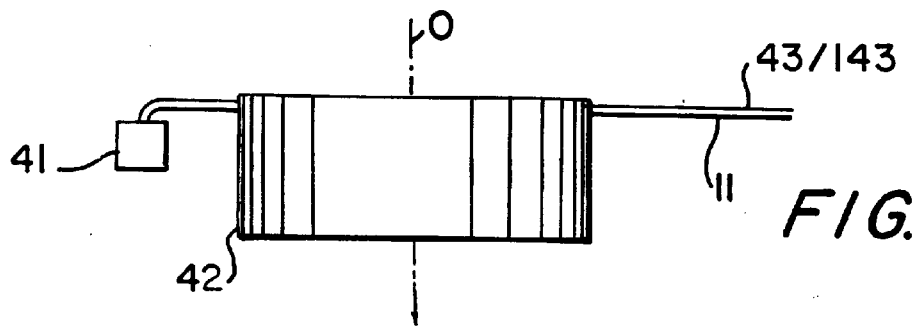
FIGS. 21b–e are views similar to FIG. 21a showing successive stages in the operation of the FIG. 21a embodiment.
Figure 21C:
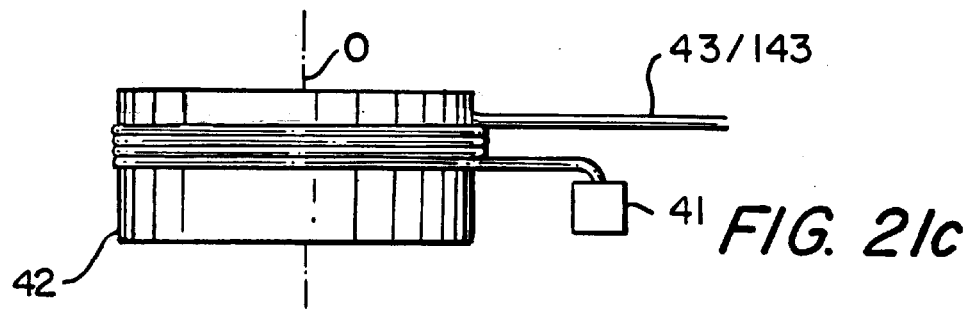
Figure 21D:
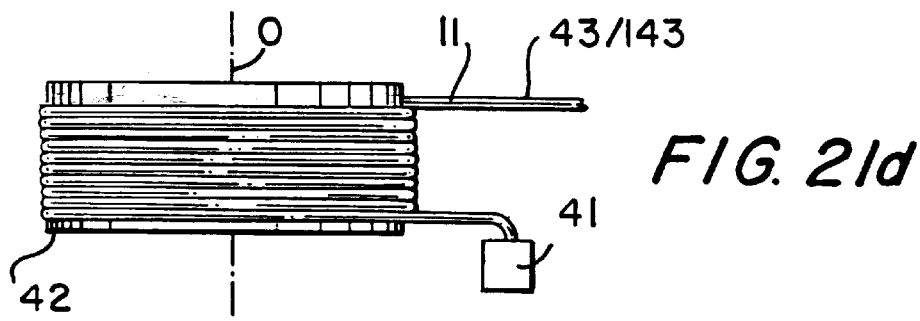
Figure 21E:
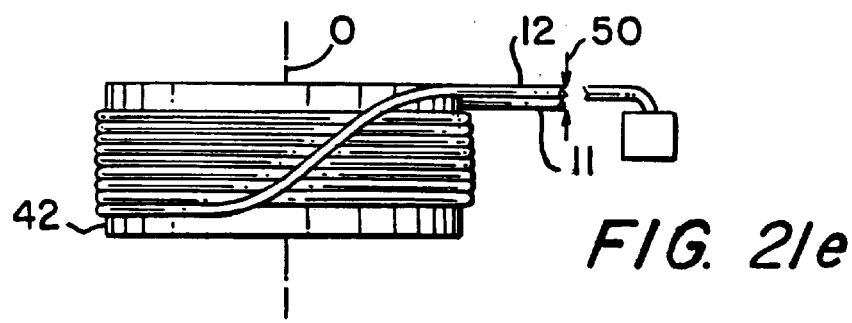

FIGS. 21a–e show a modification of the invention in which the final lead is placed in the same plane as the initial lead. Accordingly, gripper 43/143 for initial lead 11 is movable vertically relative to wire-receiving and coil-forming structure 42. Gripper 43/143 is initially relatively high relative to structure 42 and receives and holds the end of wire from wire source 41 (FIG. 21a). Wire source 41 is rotated around structure 42 and also gradually moves down relative to structure 42 as turns of wire are deposited on structure 42 (FIGS. 21b–d). Wire source 41 then moves gradually up relative to structure 42 to place a final turn in approximately the same plane as initial lead 11 (FIG. 21e). The final turn of wire is then severed from source 41 by cutter 50 to produce final lead 12 in a relatively high, final turn plane. The coil undulation steps can then be performed as described earlier in this specification.

Although embodiments in which initial lead 11 and final lead 12 are disposed in a relatively high position relative to structure 42 have been emphasized, it will be appreciated that it also may be desirable to have both initial lead 11 and final lead 12 disposed in a relatively low position with respect to structure 42. In particular, initial lead 11 and final lead 12 can be disposed in the lowermost plane of the coil relative to structure 42. This alternative results in a coil that, once installed in a stator in the position of external (outermost) coil 8 of FIG. 6, will have both initial leads disposed at the inner radius of the outer coil. Leads thus disposed, in an external coil, are more insulated from mechanical damage than leads disposed at the outer radius of the outermost coil.

An external coil configured to have both initial and final leads disposed along the inner radius when the coil is installed in a stator can be formed using a winding structure having a gripper 43 at lower level L2 as shown in FIG. 7. Accordingly, initial lead 11 is held at level L2 while wire turns are accumulated on structure 42. After the desired number of wire turns is deposited on structure 42, wire guide 41 is moved vertically relative to structure 42 to bring the final turn (destined to terminate in final lead 12) into substantially the same plane as initial lead 11.

Additionally, external coils having both leads disposed at the inner radius can be formed using a winding structure having a forming structure, such as forming structure 140', provided with a gripper 143 disposed in a lower position with respect to forming structure 140' as discussed above. Accordingly, the wire is gripped in the lower position, wire turns are accumulated on structure 42, and wire guide 41 and structure 42 are moved vertically relative to one another to allow a final lead 12 to be placed in substantially the same plane as initial lead 11.

Whether using forming member 40' with gripper 43 or using forming member 140' with gripper 143, the relative vertical displacement of structure 42 with respect to guide 41 may be accomplished by movement of either of elements 42 and 41 or both may be moved in concert.

Alternatively, an innermost coil having both initial and final leads disposed along the outer radius of the installed coil, such as coil 10 of FIG. 6, may be formed by placing both leads 11 and 12 in the lowermost plane of the coil relative to structure 42. However, such a coil requires the use of an intermediate tool in addition to the insertion tool mentioned above if the coil is to be installed with the leads positioned in the radially outer position such as in coil 10 of FIG. 6

The principles of the invention can be applied to forming undulated semi-phase coils like those described in European application No. 97110542.4 and in forming uninterrupted semi-phase coils like those described in U.S. Pat. No. 5,881,778, both of which are hereby incorporated by reference herein in their entireties.

One skilled in the art will appreciate that the present invention can be practiced by other than the described embodiments, which are presented for the purpose of illustration and not of limitation.

What is claimed is:

1. Apparatus for producing an undulating coil of wire for application to a core of a stator for a dynamo-electric machine comprising:
    a gripper configured to hold an initial lead of the wire;
    receiver structure configured to receive the wire extending from the gripper and to form a coil of the wire having successive turns that are substantially disposed in respective planes that are substantially perpendicular to a central longitudinal axis of the coil and laterally spaced from one another along that axis;
    forming structure configured to produce undulations in the turns of wire in their respective planes while the turns are on the receiver structure, the undulations giving the turns portions that are substantially radial of the axis; and
    gripper positioning structure configured to position the gripper relative to the receiver structure so that the initial lead is placed substantially in the plane in which a final turn of the coil is disposed and is substantially aligned with one of the portions of the turns that are substantially radial of the axis.

2. The apparatus defined in claim 1 wherein the receiver structure includes a first coil forming structure configured to receive the wire extending from the gripper in order to coil the wire around the axis, and wherein the forming structure includes a second coil forming structure which is initially outside the first coil forming structure, the first and second coil forming structures being movable relative to one another radially inward toward the axis, with the second coil forming structure moving to a final position which is radially inside the first coil forming structure in order to produce the undulations in the turns on the first coil forming structure.

3. The apparatus defined in claim 2 wherein the gripper is further configured to direct the initial lead outwardly of the coil.

4. The apparatus defined in claim 3 wherein the gripper is rotatable about a gripper axis which is substantially parallel to but laterally offset from the axis.

5. The apparatus defined in claim 4 wherein the gripper is further configured to receive the initial lead extending substantially radially inwardly toward the axis and to subsequently rotate so that the initial lead extends substantially radially outwardly from the axis.

6. The apparatus defined in claim 4 wherein the gripper is additionally configured to receive the initial lead extending substantially radially inwardly toward the axis and to subsequently rotate so that the initial lead extends substantially tangent to the coil.

7. The apparatus defined in claim 4 wherein the gripper is rotatable in response to tension in the wire gripped by the gripper.

8. The apparatus defined in claim 4 further comprising:
    a releasable lock structure configured to selectively prevent rotation of the gripper.

9. The apparatus defined in claim 8 wherein the releasable lock structure is further configured to lock the gripper in only certain predetermined rotational positions of the gripper.

10. The apparatus defined in claim 9 wherein the predetermined rotational positions include a position in which the gripper is aligned to receive the initial lead.

11. The apparatus defined in claim 4 wherein the gripper includes two gripper sites on respective opposite sides of the gripper axis.

12. The apparatus defined in claim 2 wherein the gripper is part of the first coil forming structure.

13. The apparatus defined in claim 1 wherein the gripper comprises:
    a shaft having a central longitudinal axis and an outer peripheral surface portion having nonuniform spacing from the central longitudinal axis in a direction annularly around the central longitudinal axis;
    an anvil structure adjacent to the outer peripheral surface portion; and
    gripper operating structure configured to produce relative motion between the shaft and the anvil structure about the central longitudinal axis whereby the initial lead of the wire can be releasably gripped between the outer peripheral surface and the anvil structure.

14. The apparatus defined in claim 13 wherein the gripper operating structure is further configured to resiliently produce relative motion between the shaft and the anvil structure about the central longitudinal axis in a direction which reduces clearance between the outer peripheral surface and the anvil in order to exert a resilient gripping force on the initial lead.

15. The apparatus defined in claim 14 wherein the gripper operating structure comprises actuator structure which is selectively operable to relative motion between the shaft and the anvil structure about the central longitudinal axis in a direction opposite to the direction which reduces clearance between the outer peripheral surface and the anvil in order to release the gripping force on the initial lead.

16. The apparatus defined in claim 13 further comprising:
mounting structure configured to mount the shaft, the anvil structure, and the gripper operating structure for selective rotation as a unit about the central longitudinal axis.

17. The apparatus defined in claim 16 wherein the mounting structure includes holding structure which is selectively operable to prevent rotation of the shaft, the anvil structure, and the gripper operating structure as a unit about the central longitudinal axis.

18. The apparatus defined in claim 17 wherein the holding structure is configured to hold the shaft, the anvil structure, and the gripper operating structure as a unit in only certain predetermined angular positions about the central longitudinal axis.

19. The apparatus defined in claim 13 wherein the outer peripheral surface is substantially symmetrical about the central longitudinal axis, wherein the anvil structure is one of two substantially similar anvil structures disposed on respective opposite sides of the shaft, and wherein the gripper operating structure is further configured to produce relative between (1) the shaft and (2) the two anvil structure about the central longitudinal axis whereby the initial lead of the wire can be releasably gripped between the outer peripheral surface and either of the anvil structures.

20. A method for producing an undulating coil of wire for application to a core of a stator for a dynamo-electric machine comprising:
gripping an initial lead of the wire in a gripper;
coiling the wire extending from the gripper on a receiver structure to form a coil of wire having successive turns that are substantially disposed in respective planes that are substantially perpendicular to a central longitudinal axis of the coil and that are laterally spaced from one another along that axis;
undulating the turns of wire in their respective planes while the turns are on the receiver structure, the undulations giving the turns portions that are substantially radial of the axis; and
positioning the gripper relative to the receiver structure so that the initial lead is placed substantially in the plane in which a final turn of the coil is disposed and is substantially aligned with one of the portions of the turns that are substantially radial of the axis.

21. The method defined in claim 20 further comprising:
forming a final lead of the wire substantially in the plane in which the final turn of the coil is disposed.

22. The method defined in claim 20 wherein the gripping comprises:
receiving the initial lead in the gripper substantially radially of the axis.

23. The method defined in claim 22 wherein the gripping further comprises:
rotating the gripped initial lead so that it is substantially tangent to the turns of wire during the coiling.

24. The method defined in claim 23 wherein the gripping still further comprises:
further rotating the gripped initial lead so that it extends substantially radially out from the axis after the coiling.

25. The method defined in claim 20 wherein the positioning comprises:
moving the gripper relative to the receiver structure.

26. Apparatus for producing an undulating coil of wire for application to a core of a stator for a dynamo-electric machine comprising:
a gripper configured to hold an initial lead of the wire;
receiver structure configured to receive the wire extending from the gripper and to form a coil of the wire having successive turns that are substantially disposed in respective planes that are substantially perpendicular to a central longitudinal axis of the coil and laterally spaced from one another along that axis;
forming structure configured to produce undulations in the turns of wire in their respective planes while the turns are on the receiver structure, the undulations giving the turns portions that are substantially radial of the axis; and
gripper positioning structure configured to position the gripper relative to the receiver structure so that the final lead is placed substantially in the plane in which an initial turn of the coil is disposed and is substantially aligned with one of the portions of the turns that are substantially radial of the axis.

27. Apparatus for forming an undulating wire coil for insertion in a stator of a dynamo-electric machine, said apparatus comprising:
a support structure configured to support wire from a source to gradually form the coil, the coil having a central axis, an initial lead, a final lead, and a plurality of wire turns, each of said wire turns defining a plane of the coil, wherein said initial and final leads are arranged in the same plane;
a plurality of forming members;
a gripper mounted on one of said plurality of forming members; and
a plurality of slanted sides, wherein:
each one of said plurality of slanted sides is disposed on one of said plurality of forming members;
each of said slanted sides has a first end portion and a second end portion, said second end portion extending to a greater radial distance from said central axis than said first end portion; and
wherein said plurality of slanted sides can support said plurality of wire turns.

28. Apparatus for forming an undulating wire coil for insertion in a stator of a dynamo-electric machine, said apparatus comprising:
a support structure configured to support wire from a source to gradually form the coil, the coil having a central axis, an initial lead, a final lead, and a plurality of wire turns, each of said wire turns defining a plane of the coil, wherein said initial and final leads are arranged in the same plane;
a plurality of forming members;
a gripper mounted on one of said plurality of forming members, wherein said gripper is configured to rotatably grip said initial lead; and
a plurality of slanted sides, wherein:
each one of said plurality of slanted sides is disposed on one of said plurality of forming members;
each of said slanted sides has a first end portion and a second end portion, said second end portion extending to a greater radial distance from said central axis than said first end portion; and wherein said plurality of slanted sides can support said plurality of wire turns.

29. Apparatus for forming an undulating wire coil for insertion in a stator of a dynamo-electric machine, said apparatus comprising:
    a support structure configured to support wire from a source to gradually form the coil, the coil having a central axis, an initial lead, a final lead, and a plurality of wire turns, each of said wire turns defining a plane of the coil, wherein said initial and final leads are arranged in the same plane, wherein:
        said support structure further comprises a forming member having an initial lead aperture, said initial lead aperture having an open side and being configured to receive said initial lead while said gripper grips said initial lead; and
        said open side permits said lead to rotate, in a plane perpendicular to said central axis, out of said initial lead aperture as said structure rotates to form said coil;
    a plurality of forming members;
    a gripper mounted on one of said plurality of forming members, wherein said gripper is configured to rotatably grip said initial lead; and
    a plurality of slanted sides, wherein:
        each one of said plurality of slanted sides is disposed on one of said plurality of forming members;
        each of said slanted sides has a first end portion and a second end portion, said second end portion extending to a greater radial distance from said central axis than said first end portion; and
        wherein said plurality of slanted sides can support said plurality of wire turns.

30. Apparatus for forming an undulating wire coil for insertion in a stator of a dynamo-electric machine, said apparatus comprising:
    a support structure configured to support wire from a source to gradually form the coil, the coil having a central axis, an initial lead, a final lead, and a plurality of wire turns, each of said wire turns defining a plane of the coil, wherein said initial and final leads are arranged in the same plane;
    a plurality of forming members;
    a gripper mounted on one of said plurality of forming members;
    a plurality of slanted sides, wherein:
        each one of said plurality of slanted sides is disposed on one of said plurality of forming members;
        each of said slanted sides has a first end portion and a second end portion, said second end portion extending to a greater radial distance from said central axis than said first end portion;
        wherein said plurality of slanted sides can support said plurality of wire turns; and
    a plurality of curved seats, wherein:
        each one of said plurality of curved seats extends from one of said plurality of slanted sides; and
        said plurality of curved seats receives wire from said source for forming a wire turn.

31. Apparatus for forming an undulating wire coil for insertion in a stator of a dynamo-electric machine, said apparatus comprising:
    a support structure configured to support wire from a source to gradually form the coil, the coil having a central axis, an initial lead, a final lead, and a plurality of wire turns, each of said wire turns defining a plane of the coil, wherein said initial and final leads are arranged in the same plane;
    a plurality of forming members;
    a gripper mounted on one of said plurality of forming members;
    a plurality of slanted sides, wherein:
        each one of said plurality of slanted sides is disposed on one of said plurality of forming members;
        each of said slanted sides has a first end portion and a second end portion, said second end portion extending to a greater radial distance from said central axis than said first end portion;
        wherein said plurality of slanted sides can support said plurality of wire turns;
    a plurality of curved seats, wherein:
        each one of said plurality of curved seats extends from one of said plurality of slanted sides; and
        said plurality of curved seats receives wire from said source for forming a wire turn; and
    a plurality of apicies, wherein:
        each one of said curved seats includes one of said apicies;
        said plurality of apicies defines a plane perpendicular to said central axis; and
        said gripper is mounted on a first side of said plane and said plurality of slanted sides is disposed on a second side of said plane.

32. Apparatus for forming an undulating wire coil for insertion in a stator of a dynamo-electric machine, said apparatus comprising:
    a support structure configured to support wire from a source to gradually form the coil, the coil having a central axis, an initial lead, a final lead, and a plurality of wire turns, each of said wire turns defining a plane of the coil, wherein said initial and final leads are arranged in the same plane;
    a plurality of forming members, wherein said plurality of forming members substantially defines a polygon about which said wire can be wound into a polygonal coil and said support structure further comprises a second plurality of forming members, wherein said second plurality can be positioned external to said polygonal coil and can be moved inward against the coil to form undulations in the coil after said wire is wound on first of said pluralities of forming members;
    a gripper mounted on one of said plurality of forming members; and
    a plurality of slanted sides, wherein:
        each one of said plurality of slanted sides is disposed on one of said plurality of forming members;
        each of said slanted sides has a first end portion and a second end portion, said second end portion extending to a greater radial distance from said central axis than said first end portion; and
        wherein said plurality of slanted sides can support said plurality of wire turns.

* * * * *

UNITED STATES PATENT AND TRADEMARK OFFICE
CERTIFICATE OF CORRECTION

PATENT NO.    : 6,386,243 B1
DATED         : May 14, 2002
INVENTOR(S)   : Andrea Bonnacorsi and Gianfranco Stratico It is certified that error appears in the above-identified patent and that said Letters Patent is hereby corrected as shown below:

Column 13,
Line 28, change "relative between" to -- relative movement between --.
Line 28, change "two anvil structure" to -- two anvil structures --.

Signed and Sealed this

Eighteenth Day of February, 2003

JAMES E. ROGAN
*Director of the United States Patent and Trademark Office*